(12) United States Patent
Nyaribo et al.

(10) Patent No.: US 12,104,288 B2
(45) Date of Patent: Oct. 1, 2024

(54) CORE-SHEATH FILAMENTS AND METHODS OF PRINTING AN ADHESIVE

(71) Applicant: 3M INNOVATIVE PROPERTIES COMPANY, St. Paul, MN (US)

(72) Inventors: Eric O. Nyaribo, Woodbury, MN (US); Thomas Q. Chastek, St. Paul, MN (US); Robert D. Waid, Maplewood, MN (US); Ross J. DeVolder, Woodbury, MN (US); Jacob D. Young, St. Paul, MN (US); Shaun M. West, St. Paul, MN (US); Mikhail A. Belkin, Minneapolis, MN (US); Joseph C. Dingeldein, Blaine, MN (US); Jay A. Esch, River Falls, MN (US); Mark E. Napierala, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 973 days.

(21) Appl. No.: 16/767,330

(22) PCT Filed: Feb. 8, 2019

(86) PCT No.: PCT/US2019/017162
§ 371 (c)(1),
(2) Date: May 27, 2020

(87) PCT Pub. No.: WO2019/164678
PCT Pub. Date: Aug. 29, 2019

(65) Prior Publication Data
US 2021/0002793 A1    Jan. 7, 2021

Related U.S. Application Data

(60) Provisional application No. 62/633,140, filed on Feb. 21, 2018.

(51) Int. Cl.
*D01F 8/10*    (2006.01)
*B33Y 30/00*    (2015.01)
(Continued)

(52) U.S. Cl.
CPC ............... *D01F 8/10* (2013.01); *B33Y 30/00* (2014.12); *B33Y 50/02* (2014.12); *C09J 7/385* (2018.01);
(Continued)

(58) Field of Classification Search
CPC ......... B33Y 30/00; B33Y 50/02; B33Y 70/00; B33Y 10/00; B29C 67/00; B29C 64/118;
(Continued)

(56) References Cited

U.S. PATENT DOCUMENTS 3,469,363 A    9/1969    Berckmoes
4,693,776 A    9/1987    Krampe
(Continued)

FOREIGN PATENT DOCUMENTS

EP    2072594    6/2009
JP    H01308471    12/1989
(Continued)

OTHER PUBLICATIONS

Kraton D1118K property sheet, https://kraton.com/product-sds/shared-files/87989/?K245DDs23U_D1118_K_Polymer-1.pdf, accessed Apr. 1, 2024 (Year: 2023).*
(Continued)

*Primary Examiner* — Alison L Hindenlang
*Assistant Examiner* — Lawrence D. Hohenbrink, Jr.
(74) *Attorney, Agent, or Firm* — Philip P. Soo

(57) ABSTRACT

The present disclosure provides a core-sheath filament. The core-sheath filament includes an adhesive core and a non-tacky sheath, wherein the sheath exhibits a melt flow index of less than 15 grams per 10 minutes. The present disclosure
(Continued)

also provides a method of printing an adhesive. The method includes a) melting a core-sheath filament in a nozzle to form a molten composition, and b) dispensing the molten composition through the nozzle onto a substrate. Steps a) and b) are carried out one or more times to form a printed adhesive. The core-sheath filament includes an adhesive core and a non-tacky sheath. Further, methods are provided, including receiving, by a manufacturing device having one or more processors, a digital object comprising data specifying an article; and generating, with the manufacturing device by an additive manufacturing process using a core-sheath filament, the article including a printed adhesive based on the digital object. A system is also provided, including a display that displays a 3D model of an article; and one or more processors that, in response to the 3D model selected by a user, cause a 3D printer to create a physical object of an article including a printed adhesive, using a core-sheath filament.

5 Claims, 6 Drawing Sheets

(51) Int. Cl.
| | | |
|---|---|---|
| *B33Y 50/02* | (2015.01) | |
| *C09J 7/38* | (2018.01) | |
| *B29C 64/118* | (2017.01) | |
| *B29C 64/209* | (2017.01) | |
| *B33Y 10/00* | (2015.01) | |
| *B33Y 70/10* | (2020.01) | |
| *C09J 7/10* | (2018.01) | |
| *D01D 5/34* | (2006.01) | |

(52) U.S. Cl.
CPC ............ *C09J 7/387* (2018.01); *B29C 64/118* (2017.08); *B29C 64/209* (2017.08); *B33Y 10/00* (2014.12); *B33Y 70/10* (2020.01); *C09J 7/10* (2018.01); *C09J 2301/202* (2020.08); *C09J 2301/302* (2020.08); *C09J 2433/00* (2013.01); *C09J 2453/00* (2013.01); *D01D 5/34* (2013.01)

(58) Field of Classification Search
CPC . B29C 64/209; D01F 8/10; D01F 8/04; D01F 8/00; C09J 7/387; C09J 7/385; C09J 7/10; C09J 2301/202; C09J 2301/302; C09J 2433/00; C09J 2453/00; D01D 5/34
USPC .................................. 264/308; 156/277, 291
See application file for complete search history.

(56) References Cited

U.S. PATENT DOCUMENTS

| | | |
|---|---|---|
| 5,209,971 A | 5/1993 | Babu |
| 5,296,547 A | 3/1994 | Nestegard |
| 5,648,425 A | 7/1997 | Everaerts |
| 5,669,207 A | 9/1997 | Hull |
| 5,981,621 A | 11/1999 | Clark |
| 6,225,243 B1 | 5/2001 | Austin |
| 6,402,870 B1 | 6/2002 | Groten |
| 6,773,531 B2 | 8/2004 | Rudisill |
| 6,777,079 B2 | 8/2004 | Zhou |
| 7,255,486 B2 | 8/2007 | Cox |
| 7,773,834 B2 | 8/2010 | Ouderkirk |
| 2005/0196612 A1* | 9/2005 | Flood ....................... D04H 3/16 428/364 |
| 2007/0031791 A1 | 2/2007 | Cinader, Jr. |
| 2011/0004486 A1 | 1/2011 | Smith |
| 2012/0231225 A1* | 9/2012 | Mikulak ................... D01F 8/12 264/255 |
| 2013/0310507 A1 | 11/2013 | Tummala |
| 2014/0011912 A1 | 1/2014 | Petry |
| 2014/0013433 A1 | 1/2014 | Turner |
| 2014/0088751 A1 | 3/2014 | Pridoehl |
| 2014/0356562 A1 | 12/2014 | Remmers |
| 2014/0357145 A1 | 12/2014 | Remmers |
| 2015/0210042 A1* | 7/2015 | Tapio .................... B32B 27/302 156/60 |
| 2015/0266243 A1 | 9/2015 | Mark |
| 2016/0311165 A1 | 10/2016 | Mark |
| 2016/0347995 A1 | 12/2016 | Wu |
| 2017/0124223 A1 | 5/2017 | Maeda |
| 2017/0298521 A1 | 10/2017 | Demuth |
| 2018/0202076 A1* | 7/2018 | Van Der Schaaf .... B33Y 70/10 |

FOREIGN PATENT DOCUMENTS

| | | |
|---|---|---|
| JP | 2002-338933 | 11/2002 |
| JP | 2004-036047 | 2/2004 |
| JP | 2015-004003 | 1/2015 |
| JP | 2016-008272 | 1/2016 |
| JP | 2016-084418 | 5/2016 |
| WO | WO 1991-007465 | 5/1991 |
| WO | WO 2009-045752 | 4/2009 |
| WO | WO 2015-067736 | 5/2014 |
| WO | WO 2016-090164 | 6/2016 |
| WO | WO 2017-009190 | 1/2017 |
| WO | WO 2017-199547 | 11/2017 |
| WO | WO 2018-094185 | 5/2018 |
| WO | WO 2018-116067 | 6/2018 |

OTHER PUBLICATIONS

Encyclopedia of Polymer Science and Engineering, Wiley-Interscience Publishers, 1988, vol. 13, 3pages.
Encyclopedia of Polymer Science and Technology, Interscience Publishers, 1964, vol. 1, 5pages.
Satas, "Handbook of Pressure Sensitive Adhesive Technology", 1989, Ed. 2, pp. 172.
Turner, "A review of melt extrusion additive manufacturing processes: I. process design and modeling"; Rapid Prototyping Journal, 2014, pp. 192-204.
International Search report for PCT International Application No. PCT/US2019/017162 mailed on Jun. 11, 2019, 3 pages.
Barczewski, "Application of waste bulk moulded composite (BMC) as a filler for isotactic polypropylene composites 11", Journal of Advanced Research, Elsevier, Amsterdam, NL, vol. 7, No. 3, Feb. 16, 2016, pp. 373-380, XP029528724.
ASTM ASTM: "D1238-13: Test Method for Melt Flow Rates of Thermoplastics by Extrusion Plastometer11", Aug. 31, 2013, XP055640865, West Conshohocken, PA.

* cited by examiner

CORE-SHEATH FILAMENTS AND METHODS OF PRINTING AN ADHESIVE

CROSS REFERENCE TO RELATED APPLICATIONS

This application is a national stage filing under 35 U.S.C. 371 of PCT/US2019/017162, filed 8 Feb. 2019, which claims the benefit of U.S. Patent Provisional Application No. 62/633,140, filed 21 Feb. 2018, the disclosures of which are incorporated by reference in their entirety herein.

TECHNICAL FIELD

The present disclosure broadly relates to core-sheath filaments including adhesive cores and non-tacky sheaths, and methods of printing adhesives, such as additive manufacturing methods.

BACKGROUND

The use of fused filament fabrication (FFF) to produce three-dimensional articles has been known for a relatively long time, and these processes are generally known as methods of so called 3D printing (or additive manufacturing). In FFF, a plastic filament is melted in a moving printhead to form a printed article in a layer by layer, additive manner. The filaments are often composed of polylactic acid, nylon, polyethylene terephthalate (typically glycol-modified), or acrylonitrile butadiene styrene.

SUMMARY

Existing polymeric filaments for additive manufacturing, e.g., in fused filament fabrication, are not adhesives. Thus, there is a need for new filaments that can be used to form printed adhesives on substrates during additive manufacturing processes.

In a first aspect, a core-sheath filament is provided. The core-sheath filament includes an adhesive core and a non-tacky sheath, wherein the sheath exhibits a melt flow index of less than 15 grams per 10 minutes (g/10 min).

In a second aspect, a method of printing an adhesive is provided. The method includes a) melting a core-sheath filament in a nozzle to form a molten composition, and b) dispensing the molten composition through the nozzle onto a substrate. Steps a) and b) are carried out one or more times to form a printed adhesive. The core-sheath filament includes an adhesive core and a non-tacky sheath.

In a third aspect, a non-transitory machine readable medium is provided. The non-transitory machine readable medium has data representing a three-dimensional model of an article, when accessed by one or more processors interfacing with a 3D printer, causes the 3D printer, using a core-sheath filament, to create an article including a printed adhesive. The core-sheath filament includes an adhesive core and a non-tacky sheath.

In a fourth aspect, a method is provided. The method includes (a) retrieving, from a non-transitory machine readable medium, data representing a 3D model of an article; (b) executing, by one or more processors, a 3D printing application interfacing with a manufacturing device using the data; and (c) generating, by the manufacturing device, using a core-sheath filament, a physical object of the article, the article including a printed adhesive. The core-sheath filament includes an adhesive core and a non-tacky sheath.

In a fifth aspect, another method is provided. The method includes (a) receiving, by a manufacturing device having one or more processors, a digital object comprising data specifying a plurality of layers of an article; and (b) generating, with the manufacturing device by an additive manufacturing process using a core-sheath filament, the article including a printed adhesive, based on the digital object. The core-sheath filament includes an adhesive core and a non-tacky sheath.

In a sixth aspect, a system is provided. The system includes (a) a display that displays a 3D model of an article and (b) one or more processors that, in response to the 3D model selected by a user, cause a 3D printer, using a core-sheath filament, to create a physical object of an article including a printed adhesive. The core-sheath filament includes an adhesive core and a non-tacky sheath.

Core-sheath filaments prepared according to at least certain embodiments of this disclosure minimize adhesion of the filament to itself (e.g., when wound on a spool) or other surfaces, typically unwinds readily from a spool, and has sufficient structural integrity to be handled and preferably used in additive manufacturing apparatuses (e.g., 3D printers) having heated nozzles.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

Figure 1:
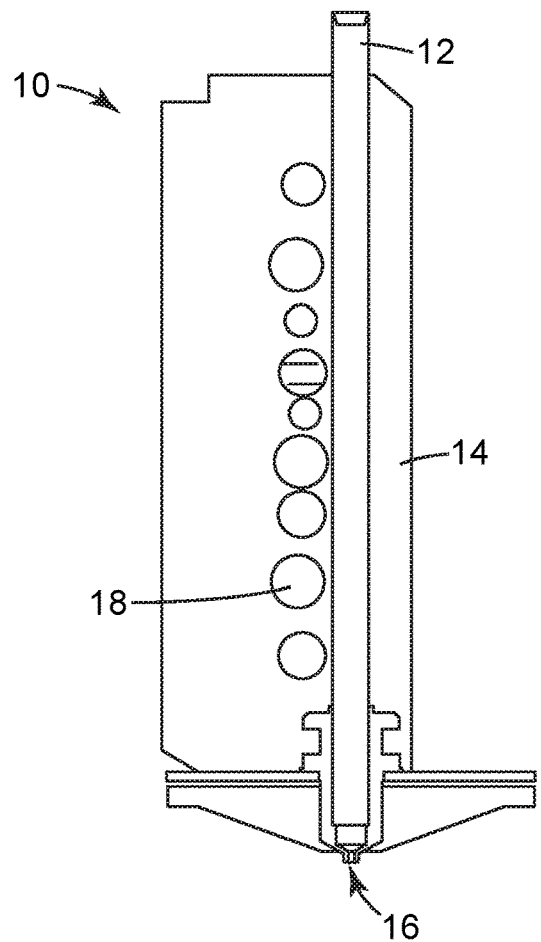
FIG. 1 is a schematic sectional view of an embodiment of an extrusion head useful in the method of the present disclosure.

While the above-identified figures set forth several embodiments of the disclosure, other embodiments are also contemplated, as noted in the description. The figures are not necessarily drawn to scale. In all cases, this disclosure presents the invention by way of representation and not limitation. It should be understood that numerous other modifications and embodiments can be devised by those skilled in the art, which fall within the scope and spirit of the principles of the invention.

DETAILED DESCRIPTION OF ILLUSTRATIVE EMBODIMENTS

The present disclosure relates to core-sheath filaments comprising an adhesive, and methods of making and using core-sheath filaments, such as printing an adhesive from a core-sheath filament using fused filament fabrication (FFF). It is noted that the materials properties required for FFF dispensing are significantly different from those required for hot melt adhesive dispensing. For instance, in the case of traditional hot melt adhesive dispensing, the adhesive is melted into a liquid inside a tank and pumped out through a hose and nozzle. Thus, traditional hot melt adhesive dispensing requires a low melt viscosity adhesive, which is often quantified as a high melt flow index (MFI) adhesive. In contrast, FFF involves melting a filament only within the nozzle at the point of dispensing, and therefore is not limited to low melt viscosity adhesives. In fact, a high melt viscosity adhesive can advantageously provide geometric stability of an adhesive after dispensing, which allows for precise and controlled placement of the adhesive. For example, an industry standard acrylonitrile butadiene styrene (ABS) filament for FFF printing has a MFI of less than 5 grams per 10 minutes and a melt viscosity that is one or more orders of magnitude higher than traditional hot melt adhesives. In addition, FFF typically requires a suitable filament to have at least a certain minimum tensile strength so that large spools of filament can be continuously fed to a nozzle without breaking. The FFF filaments are usually spooled into level wound rolls. If a core-sheath filament were to be spooled into level wound rolls, the material nearest the core would be subjected to high compressive forces. That would require the core-sheath filament to resist permanent cross sectional deformation (i.e., compression set) and self-adhesion (i.e., blocking during storage) for practical use in FFF.

Glossary

Pressure-sensitive adhesives are normally tacky at room temperature and can be adhered to a surface by application of light finger pressure and thus may be distinguished from other types of adhesives that are not pressure-sensitive. A general description of pressure-sensitive adhesives may be found in the Encyclopedia of Polymer Science and Engineering, Vol. 13, Wiley-Interscience Publishers (New York, 1988). Additional description of pressure-sensitive adhesives may be found in the Encyclopedia of Polymer Science and Technology, Vol. 1, Interscience Publishers (New York, 1964). "Pressure sensitive adhesive" or "PSA", as used herein, refers to a viscoelastic material that possesses the following properties: (1) aggressive and permanent tack, (2) adherence to a substrate other than a fluorothermoplastic film with no more than finger pressure, and (3) sufficient cohesive strength to cleanly release from the substrate. A pressure-sensitive adhesive may also meet the Dahlquist criterion described in Handbook of Pressure-Sensitive Adhesive Technology, D. Satas, $2^{nd}$ ed., page 172 (1989). This criterion defines a pressure-sensitive adhesive as one having a one-second creep compliance of greater than $1\times10^{-6}$ $cm^2/dyne$ at its use temperature (for example, at temperatures in a range of from 15° C. to 35° C.).

As used herein, "core-sheath filament" refers to a composition in which a first material (i.e., the core) is surrounded by a second material (i.e., the sheath) and the core and sheath have a common longitudinal axis. Preferably, the core and the sheath are concentric. The ends of the core do not need to be surrounded by the sheath.

As used herein, the term "non-tacky" refers to a material that passes a "Self-Adhesion Test", in which the force required to peel the material apart from itself is at or less than a predetermined maximum threshold amount, without fracturing the material. The Self-Adhesion Test is described below and is typically performed on a sample of the sheath material to determine whether or not the sheath is non-tacky.

As used herein, "melt flow index" refers to the amount of polymer that can be pushed through a die at a specified temperature using a specified weight. Melt Flow Index can be determined using ASTM 1238-13, Procedure A, using the conditions of Table 7 (and if a polymer is not listed in Table 7, using the conditions of Table X4.1 for the polymer having the highest listed weight and highest listed temperature).

As used herein, "integral" refers to being made at the same time or being incapable of being separated without damaging one or more of the (integral) parts.

As used herein, the term "(meth)acrylate" is a shorthand reference to acrylate, methacrylate, or combinations thereof; "(meth)acrylic" is a shorthand reference to acrylic, methacrylic, or combinations thereof; and "(meth)acryloyl" is a shorthand reference to acryloyl, methacryloyl, or combinations thereof. As used herein, "(meth)acrylate-functional compounds" are compounds that include, among other things, a (meth)acrylate moiety.

As used herein, "alkyl" includes straight-chained, branched, and cyclic alkyl groups and includes both unsubstituted and substituted alkyl groups. Unless otherwise indicated, the alkyl groups typically contain from 1 to 20 carbon atoms. Examples of "alkyl" as used herein include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, and norbornyl, and the like. Unless otherwise noted, alkyl groups may be mono- or polyvalent, i.e., monovalent alkyl or polyvalent alkylene.

As used herein, "heteroalkyl" includes both straight-chained, branched, and cyclic alkyl groups with one or more heteroatoms independently selected from S, O, and N with both unsubstituted and substituted alkyl groups. Unless otherwise indicated, the heteroalkyl groups typically contain from 1 to 20 carbon atoms. Examples of "heteroalkyl" as used herein include, but are not limited to, methoxy, ethoxy, propoxy, 3,6-dioxaheptyl, 3-(trimethylsilyl)-propyl, 4-dimethylaminobutyl, and the like. Unless otherwise noted, heteroalkyl groups may be mono- or polyvalent, i.e., monovalent heteroalkyl or polyvalent heteroalkylene.

By "carboxyl" is meant —COOH groups, it being understood that such groups can exist in their neutral (—COOH) form, or can exist in their deprotonated (—COO) form.

As used herein, "halogen" includes F, Cl, Br, and I.

As used herein, "aryl" is an aromatic group containing 5-18 ring atoms and can contain optional fused rings, which may be saturated, unsaturated, or aromatic. Examples of an aryl groups include phenyl, naphthyl, biphenyl, phenanthryl, and anthracyl. Heteroaryl is aryl containing 1-3 heteroatoms such as nitrogen, oxygen, or sulfur and can contain fused rings. Some examples of heteroaryl groups are pyridyl, furanyl, pyrrolyl, thienyl, thiazolyl, oxazolyl, imidazolyl, indolyl, benzofuranyl, and benzthiazolyl. Unless otherwise noted, aryl and heteroaryl groups may be mono- or polyvalent, i.e., monovalent aryl or polyvalent arylene.

As used herein, "heteroaromatic" is an aromatic group containing 1-3 heteroatoms such as nitrogen, oxygen, or sulfur, and can contain fused rings, e.g., substituted phenyl groups.

As used herein, "acryloyl" is used in a generic sense and mean not only derivatives of acrylic acid, but also amine, and alcohol derivatives, respectively. "(meth)acryloyl" includes both acryloyl and methacryloyl groups; i.e., is inclusive of both esters and amides.

As used herein, "oligomer" refers to a molecule that has one or more properties that change upon the addition of a single further repeat unit.

As used herein, "polymer" refers to a molecule having one or more properties that do not change upon the addition of a single further repeat unit. The polymer can be a homopolymer, copolymer, terpolymer, and the like. The term "copolymer" means that there are at least two monomers used to form the polymer.

As used herein, "macromer" refers to an oligomer or polymer having a functional group at the chain end, and is a shortened version of the term "macromolecular monomer".

As used herein, the term "styrenic" refers to materials, and/or components, and/or copolymers, and/or glassy blocks that are derived from styrene or another mono-vinyl aromatic monomer similar to styrene.

As used herein, the terms "glass transition temperature" and "$T_g$" are used interchangeably and refer to the glass transition temperature of a material or a mixture. Unless otherwise indicated, glass transition temperature values are determined by Differential Scanning calorimetry (DSC).

As used herein, "thermoplastic" refers to a polymer that flows when heated sufficiently above its glass transition point and become solid when cooled.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a", "an", and "the" are not intended to refer to only a singular entity, but include the general class of which a specific example may be used for illustration. The terms "a", "an", and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

As used herein in connection with a measured quantity, the term "about" refers to that variation in the measured quantity as would be expected by the skilled artisan making the measurement and exercising a level of care commensurate with the objective of the measurement and the precision of the measuring equipment used. Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

Figure 2:
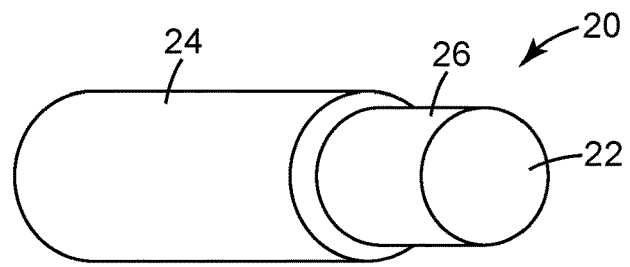
FIG. 2 is a schematic perspective exploded view of a section of a core-sheath filament, according to an embodiment of the present disclosure.

Core-Sheath Filament:

In a first aspect, a core-sheath filament is provided. The core-sheath filament comprises an adhesive core and a non-tacky sheath, wherein the sheath exhibits a melt flow index of less than 15 grams per 10 minutes (g/10 min). Referring to FIG. 2, a schematic perspective exploded view of a section of a core-sheath filament 20 is provided, comprising a core 22 and a sheath 24 encasing the outer surface 26 of the core 22.

Typically, the core-sheath filament has a relatively narrow diameter, to allow for use in precise applications of an adhesive. For instance, the core-sheath filament can comprise an average diameter of 1 millimeter (mm) or greater, 2 mm or greater, 3 mm or greater, 4, mm or greater, or 5 mm or greater; and 10 mm or less, 8 mm or less, 6 mm or less, or 4 mm or less. Stated another way, the core-sheath filament may comprise an average diameter of 1 to 10 mm, inclusive; 2 to 6 mm; inclusive, or 3 mm.

Often, the core-sheath filament has an aspect ratio of length to diameter of 50:1 or greater, 100:1 or greater, or 250:1 or greater. Core-sheath filaments having a length of at least about 20 feet (6 meters) can be useful in a method according to the present disclosure. Depending on the application of use of the core-sheath filament, having a relatively consistent diameter over its length can be desirable. For instance, an operator might calculate the amount of material being melted and dispensed based on the expected mass of filament per predetermined length, but if the mass per length varies widely, the amount of material dispensed may not match the calculated amount. In some embodiments, the core-sheath filament comprises a maximum variation of diameter of 20% over a length of 50 centimeters (cm), or even a maximum variation in diameter of 15% over a length of 50 cm.

Filaments, or strands, according to the present disclosure and/or useful for practicing some embodiments of the method of the present disclosure, can generally be made using techniques known in the art for making filaments. Filaments, or strands, can be made by extrusion through a die, such as a coaxial die to form the core-sheath structure.

Core-sheath filaments described herein can exhibit a variety of desirable properties, both as prepared and as an adhesive. As formed, a core-sheath filament has strength consistent with being handling by a person without fracture of the sheath. The extent of structural integrity of the core-sheath filament needed varies according to the specific application of use. Preferably, a core-sheath filament has strength consistent with the requirements and parameters of one or more additive manufacturing devices (e.g., 3D printing systems). One additive manufacturing apparatus, however, could subject a polymeric filament to a greater force when feeding the filament to a deposition nozzle than a different apparatus. Advantageously, the elongation at break of the sheath material of the core-sheath filament is typically 50% or greater, 60% or greater, 80% or greater, 100% or greater, 250% or greater, 400% or greater, 750% or greater, 1000% or greater, 1400% or greater, or 1750% or greater; and 2000% or less, 1500% or less, 900% or less, 500% or less, or 200% or less. Stated another way, the elongation at break of the sheath material of the core-sheath filament can range from 50% to 2000%. In some embodiments, the elongation at break is at least 60%. Elongation at break can be measured, for example, by the methods outlined in ASTM D638-14, using test specimen Type IV.

In some embodiments, filaments, or strands, according to the present disclosure and/or useful for practicing some embodiments of the method of the present disclosure are made by extrusion through a coaxial die. Optional additives can be added to an adhesive composition in an extruder (e.g., a twin-screw extruder) equipped with a side stuffer that allows for the inclusion of additives. Similarly, optional additives can be added to a sheath composition in the extruder. The adhesive core can be extruded through the center layer of a coaxial die having an appropriate diameter while the non-tacky sheath can be extruded through the outer layer of the coaxial die. Often, the shape of the center layer is circular or oval, and the shape of the outer layer is concentric around the center layer. One suitable die is a filament spinning die as described in U.S. Pat. No. 7,773,834 (Ouderkirk et al.). Optionally, the strand can be cooled upon extrusion using a water bath. The filament can be lengthened using a belt puller. The speed of the belt puller can be adjusted to achieve a desired filament diameter.

Advantages provided by at least certain embodiments of employing the core-sheath filament as an adhesive once it is melted and mixed include one or more of: low volatile organic compound (VOC) characteristics, avoiding die cutting, design flexibility, achieving intricate non-planar bonding patterns, printing on thin and/or delicate substrates, and printing on an irregular and/or complex topography.

Without wishing to be bound by theory, it is believed that the overall final adhesive material property of a dispensed core-sheath filament will demonstrate viscoelasticity; i.e., demonstrating stress relaxation over time. On the other hand, a desirable property of the sheath material is its ability to hold energy under a static load, showing minimal stress dissipation over time. A low MFI and a high tensile strength help prevent the core-sheath filament from breaking when subjected to high inertial forces, such as when the core-sheath is starting to be unspooled.

In some cases, it is advantageous to balance the sheath requirements and the overall adhesive performance by using a sheath material that can play a functional role in the overall adhesive. For example, a non-tacky styrenic block copolymer or an acrylic copolymer can be used in the sheath at relatively high concentrations without negatively impacting overall adhesion of dispensed filament. Preferably, the adhesive core comprises a pressure sensitive adhesive. In certain embodiments, when the core-sheath filament is melted and the core and sheath are mixed together to form a mixture, the mixture exhibits a glass transition temperature ($T_g$) of 0° C. or less, −10° C. or less, or −20° C. or less.

Suitable components of the core-sheath filament are described in detail below.

Core

The core typically makes up 50 wt. % or more of the total core-sheath filament, 55 wt. % or more, 60 wt. % or more, 65 wt. % or more, 70 wt. % or more, 75 wt. % or more, 80 wt. % or more, 85 wt. % or more, or even 90 wt. % or more of the total weight of the core-sheath filament; and 96 wt. % or less, 94 wt. % or less, 90 wt. % or less, 85 wt. % or less, 80 wt. % or less, 70 wt. % or less, or 65 wt. % or less of the total weight of the core-sheath filament. Stated another way, the sheath can be present in an amount of 50 wt. % to 96 wt. % of the core-sheath filament, 60 to 90 wt. %, 70 to 90 wt. %, 50 to 70 wt. %, or 80 to 96 wt. % of the core-sheath filament.

The adhesive core can be made using a number of different chemistries, including for instance, styrenic block copolymers, (meth)acrylics, (meth)acrylic block copolymers, natural rubber, styrene butadiene rubber, butyl rubber, polyisobutylene, ethylene vinyl acetate, amorphous poly(alpha-olefins), silicones, polyvinyl ether, polyisoprene, polybutadiene, butadiene-acrylonitrile rubber, polychoroprene, polyurethane, polyvinylpyrrolidone, or combinations thereof.

In many embodiments, the adhesive core comprises a styrenic block copolymer and a tackifier. Any number of styrenic block copolymers can be incorporated into the adhesive core; one, two, three, four, or even more different styrenic block copolymers may be included in the adhesive core. In some embodiments, a suitable styrenic block copolymer comprises a copolymer of a (meth)acrylate with a styrene macromer. In select embodiments, the adhesive core comprises a (meth)acrylic polymer.

Styrenic Block Copolymers

A suitable styrenic block copolymer has at least one rubbery block and two or more glassy blocks. The styrenic block copolymer is often a linear block copolymer of general formula $(G-R)_mG$ where G is a glassy block, R is a rubbery block, and m is an integer equal to at least 1. Variable m can be, for example, in a range of 1 to 10, in a range of 1 to 5, in a range of 1 to 3, or equal to 1. In many embodiments, the linear block copolymer is a triblock copolymer of formula G-R-G where the variable m in the formula $(G-R)_m$-G is equal to 1. Alternatively, a suitable styrenic block copolymer can be a radial (i.e., multi-arm) block copolymer of general formula $(G-R)_n$-Y where each R and G are the same as defined above, n is an integer equal to at least 3, and Y is the residue of a multifunctional coupling agent used in the formation of the radial block copolymer. The variable n represents the number of arms in the radial block copolymer and can be at least 4, at least 5, or at least 6 and often can be up to 10 or higher, up to 8, or up to 6. For example, the variable n is in a range of 3 to 10, in a range of 3 to 8, or in a range of 3 to 6.

In both the linear block copolymer and radial block copolymer versions of the styrenic block copolymer, the glassy blocks G can have the same or different molecular weight. Similarly, if there is more than one rubbery block R, the rubbery blocks can have the same or different molecular weights.

Generally, each rubbery block has a glass transition temperature ($T_g$) that is less than room temperature. For example, the glass transition temperature is often less than 20° C., less than 0° C., less than −10° C., or less than −20° C. In some examples, the glass transition temperature is less than −40° C. or even less than −60° C.

Each rubbery block R in the linear or radial block copolymers is typically the polymerized product of a first polymerized conjugated diene, a hydrogenated derivative of a polymerized conjugated diene, or a combination thereof. The conjugated diene often contains 4 to 12 carbon atoms. Example conjugated dienes include, but are not limited to, butadiene, isoprene, 2-ethylbutadiene, 1-phenylbutadiene, 1,3-pentadiene, 1,3-hexadiene, 2,3-dimethyl-1,3-butadiene, and 3-ethyl-1,3-hexadiene.

Each rubbery block R can be a homopolymer or copolymer. The rubbery block R is often poly(butadiene), poly(isoprene), poly(2-ethylbutadiene), poly(1-phenylbutadiene), poly(1,3-pentadiene), poly(1,3-hexadiene), poly(2,3- dimethyl-1,3-butadiene), poly(3-ethyl-1,3-hexadiene), poly (ethylene/propylene), poly(ethylene/butylene), poly (isoprene/butadiene), or the like. In many embodiments, the block R is polybutadiene, polyisoprene, poly(isoprene/butadiene), poly(ethylene/butylene), or poly(ethylene/propylene).

The glass transition temperature of each glassy block G is generally at least 50° C., at least 60° C., at least 70° C., at least 80° C., at least 90° C., or even at least 100° C.

Each glassy block G in the linear or radial block copolymers is typically the polymerized product of a first mono-vinyl aromatic monomer. The mono-vinyl aromatic monomer usually contains, for example, at least 8 carbon atoms, at least 10 carbon atoms, or at least 12 carbon atoms and up to 18 carbon atoms, up to 16 carbon atoms, or up to 14 carbon atoms. Example first mono-vinyl aromatic monomers include, but are not limited to, styrene, vinyl toluene, alpha-methyl styrene, 2,4-dimethyl styrene, ethyl styrene, 2,4-diethyl styrene, 3,5-diethyl styrene, alpha-2-methyl styrene, 4-tert-butyl styrene, 4-isopropyl styrene, and the like.

Each glassy block G can be a homopolymer or a copolymer. The glassy block G is often poly(styrene), poly(vinyl toluene), poly(alpha-methyl styrene), poly(2,4-dimethyl styrene), poly(ethyl styrene), poly(2,4-diethyl styrene), poly(3,5-diethyl styrene), poly(alpha-2-methyl styrene), poly(4-tert-butyl styrene), poly(4-isopropyl styrene), copolymers thereof, and the like.

In many embodiments, each glassy block G is polystyrene homopolymer or is a copolymer derived from a mixture of styrene and a styrene-compatible monomer, which is a monomer that is miscible with styrene. In most cases where the glassy phase is a copolymer, at least 50 weight percent of the monomeric units are derived from styrene. For example, at least 60 weight percent, at least 70 weight percent, at least 80 weight percent, at least 90 weight percent, at least 95 weight percent, at least 98 weight percent, or at least 99 weight percent of the monomeric units in the glassy block G is derived from styrene.

The styrenic block copolymer typically contains at least 5 weight percent and can contain up to 50 weight percent glassy blocks G. If the amount of glassy blocks G is too low, the cohesive strength may be too low because there is not sufficient physical crosslinking. On the other hand, if the amount of glassy blocks G is too high, the modulus may be too high (the composition may be too stiff and/or too elastic) and the resulting composition will not wet out well (spread on a surface such as on a substrate surface) when the molten adhesive is deposited on a substrate. For example, the styrenic copolymer often contains at least 6 weight percent, at least 7 weight percent, at least 8 weight percent, at least 9 weight percent, or at least 10 weight percent and up to 45 weight percent, up to 40 weight percent, up to 35 weight percent, up to 30 weight percent, up to 25 weight percent, up to 20 weight percent, or up to 15 weight percent glassy blocks G. The weight percent values are based on the total weight of the styrenic block copolymer. The remainder of the weight of the styrenic block copolymer is mainly attributable to the rubbery blocks.

In some embodiments, the styrenic block compound is a linear triblock copolymer and the triblock copolymer typically contains at least 10 weight percent glassy blocks G. For example, the triblock copolymer contains at least 15 weight percent or at least 20 weight percent glassy blocks. The amount of the glassy blocks in the triblock copolymer can be up to 35 weight percent. For example, the triblock copolymer can contain up to 30 weight percent or up to 25 weight percent glassy blocks G. In some examples, the triblock copolymer contains 10 to 35 weight percent, 10 to 30 weight percent, 10 to 25 weight percent, or 10 to 20 weight percent of the glassy blocks. The weight percent values are based on the total weight of the triblock copolymer. The remainder of the weight of the linear triblock copolymer is attributable to the rubbery block. For example, the linear triblock copolymer can contain 10 to 35 weight percent glassy blocks and 65 to 90 weight percent rubbery block, 10 to 30 weight percent glassy block and 70 to 90 weight percent rubbery block, 10 to 25 weight percent glassy block and 75 to 90 weight percent rubbery block, or 10 to 20 weight percent of the glassy blocks and 80 to 90 weight percent rubbery blocks based on a total weight of the linear triblock copolymer.

In addition to the glassy blocks G and the rubbery blocks R, styrenic block copolymers that are radial block copolymers include a multifunctional coupling agent J. The coupling agent often has multiple carbon-carbon double bonds, carbon-carbon triple bonds, or other groups that can react with carbamions of the living polymer used to form the radial block copolymers. The multifunctional coupling agents can be aliphatic, aromatic, heterocyclic, or a combination thereof. Examples include, but are not limited to, polyvinyl acetylene, diacetylene, di(meth)acrylates (e.g., ethylene dimethacrylate), divinyl benzene, divinyl pyridine, and divinyl thiophene. Other examples include, but are not limited to, multi-functional silyl halide (e.g., tetrafunctional silyl halide), polyepoxides, polyisocyanates, polyketones, polyanhydrides, polyalkenyls, and dicarboxylic acid esters.

The weight average molecular weight of the styrenic block copolymer is often no greater than 1,200,000 Daltons (Da). If the weight average molecular weight is too high, the copolymer would be difficult to extrude due to its high melt viscosity and would be difficult to blend with other materials. The weight average molecular weight is often no greater than 1,000,000 Da, no greater than 900,000 Da, no greater than 800,000 Da, no greater than 600,000 Da, or no greater than 500,000 Da. The weight average molecular weight of the styrenic block copolymer is typically at least 75,000 Da. If the weight average molecular weight is too low, the cohesive strength of the resulting adhesive may be unacceptably low. The weight average molecular weight is often at least 100,000 Da, at least 200,000 Da, at least 300,000 Da, or at least 400,000 Da. For example, the styrenic block copolymer can be in the range of 75,000 to 1,200,000 Da, in a range of 100,000 to 1,000,000 Da, in a range of 100,000 to 900,000 Da, or in a range of 100,000 to 500,000 Da. Radial block copolymers often have a higher weight average molecular weight than linear triblock copolymers. For example, in some embodiments, the radial block copolymers have a weight average molecular weight in a range of 500,000 to 1,200,000, in a range of 500,000 to 1,000,000 Da or in a range of 500,000 to 900,000 Da while the linear triblock copolymers have a weight average molecular weight in a range of 75,000 to 500,000 Da, in a range of 75,000 to 300,000 Da, in a range of 100,000 to 500,000 Da, or in a range of 100,000 to 300,000 Da.

Some styrenic block copolymers are polymodal block copolymers. As used herein, the term "polymodal" means that the two or more glassy blocks do not all have the same weight average molecular weight. The polymodal block copolymers are usually "asymmetric", which means that the arms are not all identical. Such block copolymers can be characterized as having at least one "high" molecular weight glassy block and at least one "low" molecular weight glassy block, wherein the terms high and low are relative to each other. In some embodiments, the ratio of the number average molecular weight of the high molecular weight glassy block (Mn)$_H$, relative to the number average molecular weight of the low molecular weight glassy block (Mn)$_L$ is at least 1.25. Methods of making asymmetrical, polymodal styrenic block copolymers are described, for example, in U.S. Pat. No. 5,296,547 (Nestegard et al.).

Some particular styrenic block copolymers have glassy blocks that are polystyrene and one or more rubbery blocks selected from polyisoprene, polybutadiene, poly(isoprene/butadiene), poly(ethylene/butylene), and poly(ethylene/propylene). Some even more particular styrenic block copolymers have glassy blocks that are polystyrene and one or more rubbery blocks selected from polyisoprene and polybutadiene, e.g., styrene butadiene rubber (SBR).

The styrenic block copolymers create physical crosslinks within the adhesive and contribute to the overall elastomeric character of the (e.g., pressure sensitive) adhesive. Typically, higher glassy block levels enhance the amount of physical crosslinking that occurs. More physical crosslinking tends to increase the shear strength of the adhesive.

In addition to the styrenic block copolymer described in detail above, a styrenic diblock copolymer may further be included in the core. This second styrenic copolymer can be separately added to the first styrenic block copolymer; however, many commercially available linear styrenic block copolymers (e.g., triblock copolymers) include some styrenic diblock copolymer. The diblock copolymer has a single glassy block G and a single rubbery block R. The diblock copolymer (G-R) can lower the viscosity of the adhesive and/or provide functionality that is typically obtained by addition of a plasticizer. Like a plasticizer, the diblock copolymer can increase the tackiness and low temperature performance of the resulting adhesive. The diblock copolymer also can be used to adjust the flow of the adhesive. The amount of diblock needs to be selected to provide the desired flow characteristics without adversely affecting the cohesive strength of the adhesive.

The same types of glassy blocks G and rubbery blocks R described above for use in the styrenic block copolymer (e.g., triblock and radial block copolymer) can be used for the styrenic diblock copolymer). Often, however, it can be advantageous to not select the same rubbery block for both block copolymers to facilitate the solubility of other components such as the tackifier in the core.

The amount of glassy block G in the styrenic diblock copolymer is often at least 10 weight percent based on a weight of the diblock copolymer. In some embodiments, the diblock contains at least 15 weight percent, at least 20 weight percent, or at least 25 weight percent glassy block. The amount of glassy block can be up to 50 weight percent, up 45 weight percent, up to 40 weight percent, up to 35 weight percent, or up to 30 weight percent. For example, the diblock can contain 10 to 50 weight percent, 10 to 40 weight percent, 15 to 50 weight percent, 15 to 40 weight percent, 20 to 50 weight percent or 20 to 40 weight percent glassy block. The weight percent values are based on the total weight of the diblock copolymer. The remainder of the weight of the diblock copolymer is mainly attributable to the rubbery block.

The weight average molecular weight of the styrenic diblock copolymer can be up to 250,000 Da, up to 225,000 Da, up to 200,000 Da, or up to 175,000 Da. If the molecular weight is too high, the diblock copolymer may not function to provide the desired flow characteristics or to provide other desired characteristics such as, for example, reducing the elastic modulus and/or increasing the tackiness of the (e.g., pressure-sensitive) adhesive. The weight average molecular weight is often at least 75,000 Da, at least 100,000 Da, at least 125,000 Da, or at least 150,000 Da. For example, weight average molecular weight of the diblock copolymer can be in a range of 75,000 to 250,000 Da, in a range of 100,000 to 250,000 Da, in a range of 125,000 to 250,000 Da, or in a range of 125,000 to 200,000 Da.

The core often comprises styrenic material containing 0 to 30 weight percent of the styrenic diblock copolymer based on a total weight of all styrenic material present. In some embodiments, there is at least 1 wt. % or at least 5 wt. % and up to 25 wt. %, up to 20 wt. %, up to 15 wt. %, or up to 10 wt. % of the styrenic diblock copolymer. If too much of the diblock is added, the shear strength of the (e.g., pressure-sensitive) adhesive may be undesirably low. In some example core compositions, the styrenic block copolymer having at least one rubbery block and two or more glassy blocks is present in an amount of 70 to 100 wt. % of all styrenic material and the styrenic diblock copolymer is present in an amount of 0 to 30 wt. % of all styrenic material. Stated differently, styrenic material may contain 70 to 100 wt. % of a radial block copolymer and/or linear block copolymer (e.g., linear triblock copolymer) and 0 to 30 wt. % diblock copolymer.

Suitable styrenic materials for use in the core, either alone or in combination, are commercially available under the trade designation KRATON (e.g., KRATON D116 P, D1118, D1119, and A1535) from Kraton Performance Polymers (Houston, TX, USA), under the trade designation SOLPRENE (e.g., SOLPRENE S-1205) from Dynasol (Houston, TX., USA), under the trade designation QUINTAC from Zeon Chemicals (Louisville, KY, USA), and under the trade designations VECTOR and TAIPOL from TSRC Corporation (New Orleans, LA, USA).

In select embodiments, the styrenic block copolymer comprises a copolymer of a (meth)acrylate with a styrene macromer. This styrenic copolymer can be separately added to the core. Typically, this styrenic copolymer comprises the reaction product of a monomeric acrylate or a methacrylate ester of a non-tertiary alcohol with a styrene macromer and additional optional monomers. Suitable macromers include styrene/acrylonitrile copolymer and polystyrene macromers. Examples of useful macromers and their preparation are described in detail in U.S. Pat. No. 4,693,776 (Krampe et al.).

When the core includes a styrenic material, the (e.g., pressure-sensitive) adhesive contains 40 wt. % to 60 wt. % of one or more styrenic copolymers, based on the total weight of the adhesive, plus one or more tackifiers (and optionally additives). If the amount of the styrenic material is too low, the tackifier level may be too high and the resulting $T_g$ of the composition may be too high for successful adhesion, particularly in the absence of a plasticizer. If the amount of the styrenic material is too high, however, the composition may have a modulus that is too high (e.g., the composition may be too stiff and/or too elastic) and the composition may not wet out well when the core-sheath filament is melted, mixed, and applied to a substrate. The amount of the styrenic material can be at least 45 weight percent or at least 50 weight percent and up to 55 weight percent or up to 50 weight percent. In some embodiments, the amount of the styrenic material is in a range of 40 to 60 weight percent, 40 to 55 weight percent, 40 to 50 weight percent, 45 to 60 weight percent, 45 to 55 weight percent, or 50 to 60 weight percent based on the total weight of the core.

Tackifier

When a styrenic material is incorporated in the core, a tackifier is typically used to impart tackiness to the adhesive. Examples of suitable tackifiers include rosins and their derivatives (e.g., rosin esters); polyterpenes and aromatic-modified polyterpene resins; coumarone-indene resins; hydrocarbon resins, for example, alpha pinene-based resins, beta pinene-based resins, limonene-based resins, aliphatic hydrocarbon-based resins, aromatic-modified hydrocarbon-based resins; or combinations thereof. Non-hydrogenated tackifiers are typically more colorful and less durable (i.e., weatherable). Hydrogenated (either partially or completely) tackifiers may also be used. Examples of hydrogenated tackifiers include, for example: hydrogenated rosin esters, hydrogenated acids, hydrogenated aromatic hydrocarbon resins, hydrogenated aromatic-modified hydrocarbon-based resins, hydrogenated aliphatic hydrocarbon-based resins, or combinations thereof. Examples of synthetic tackifiers include: phenolic resins, terpene phenolic resins, poly-t-butyl styrene, acrylic resins, or combinations thereof.

Exemplary hydrogenated hydrocarbon tackifiers include C9 and C5 hydrogenated hydrocarbon tackifiers. Examples of C9 hydrogenated hydrocarbon tackifiers include those sold under the trade designation: REGALITE S-5100, REGALITE R-7100, REGALITE R-9100, REGALITE R-1125, REGALITE S-7125, REGALITE S-1100, REGALITE R-1090, REGALREZ 6108, REGALREZ 1085, REGALREZ 1094, REGALREZ 1126, REGALREZ 1139, and REGALREZ 3103, sold by Eastman Chemical Co., Middelburg, Netherlands; PICCOTAC and EASTOTAC sold by Eastman Chemical Co.; ARKON P-140, ARKON P-125, ARKON P-115, ARKON P-100, ARKON P-90, ARKON M-135, ARKON M-115, ARKON M-100, and ARKON M-90 sold by Arakawa Chemical Inc., Chicago, Ill.; and ESCOREZ 5000 series sold by Exxon Mobil Corp., Irving, Tex.

In some embodiments, the core comprises a linear, (meth)acrylic-based polymeric tackifier. As used herein, the term "(meth)acrylic-based polymeric tackifier" refers to a polymeric material that is formed from a first monomer composition wherein at least 60 weight percent, at least 70 weight percent, at least 80 weight percent, at least 90 weight percent, at least 95 weight percent, at least 98 weight percent, at least 99 weight percent, or 100 weight percent of the monomers have a (meth)acryloyl group of formula —(CO)—CR=CH$_2$, where R is hydrogen or methyl. The (meth)acrylic-based polymeric tackifier has a glass transition temperature equal to at least 50° C. In some embodiments, the glass transition temperature ($T_g$) is at least 75° C. or at least 100° C. The glass transition temperature can be measured using a technique such as Differential Scanning calorimetry or Dynamic Mechanical Analysis.

Some particular (meth)acrylic-based polymeric tackifiers contain up to 100 weight percent methyl methacrylate monomeric units. Other particular (meth)acrylic-based polymeric tackifiers contain a mixture of isobornyl (meth)acrylate monomeric units and a polar monomeric unit such as (meth)acrylic acid monomeric units or N,N-dimethylacrylamide monomeric units. Some suitable (meth)acrylic-based polymeric tackifiers are commercially available under the trade designation ELVACITE (e.g., ELVACITE 2008C, E2013, E2043, and E4402) from Lucite International incorporated (Cordova, TN, USA).

Any suitable amount of one or more tackifiers may be used. In some embodiments, the total amount of tackifier may be present in the core in an amount of 30 parts by weight or more, based on 100 parts by weight of total styrenic material. Optionally, the tackifier may be present in an amount of about 40 parts by weight to about 400 parts by weight, 40 parts by weight to about 200 parts by weight, 60 parts by weight to about 140 parts by weight, or even 80 parts by weight to about 120 parts by weight, based on the weight of the acrylic block copolymer.

(Meth)Acrylic Polymers

In certain embodiments, the core comprises one or more (meth)acrylic-based adhesive polymers. (Meth)acrylic-based polymers have been described, for example, in the following patent references: EP Patent Application 2072594 A1 (Kondou et al.), U.S. Pat. No. 5,648,425 (Everaerts et al.), U.S. Pat. No. 6,777,079 B2 (Zhou et al.), and U.S. Patent Application Publication 2011/04486 A1 (Ma et al.).

In some embodiments, the (meth)acrylic polymer comprises the reaction product of a polymerizable composition comprising a chain transfer agent, a polar monomer, and at least one alkyl (meth)acrylate. Suitable representative chain transfer agents, polar monomers, and alkyl (meth)acrylate monomers are each described in detail below.

Examples of suitable alkyl (meth)acrylate monomers incorporated into (meth)acrylic polymers include, but are not limited to, methyl methacrylate, ethyl methacrylate, propyl methacrylate, n-butyl methacrylate, sec-butyl methacrylate, isobutyl methacrylate, tert-butyl methacrylate, n-hexyl methacrylate, cyclohexyl methacrylate, 2-ethylhexyl (meth)acrylate, isooctyl acrylate, n-octyl methacrylate, and 3,3,5-trimethylcyclohexyl methacrylate, and isobornyl (meth)acrylate.

Examples of suitable non-acid functional polar monomers include, but are not limited to, 2-hydroxyethyl (meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl) (meth)acrylates including 2-(2-ethoxyethoxy)ethyl (meth)acrylate, 2-ethoxyethyl (meth)acrylate, 2-methoxyethoxyethyl (meth)acrylate, 2-methoxyethyl methacrylate, polyethylene glycol mono (meth)acrylates; alkyl vinyl ethers, including vinyl methyl ether; and mixtures thereof. Preferred polar monomers include those selected from the group consisting of 2-hydroxyethyl (meth)acrylate and N-vinylpyrrolidinone.

Examples of suitable acid functional polar monomers include, but are not limited to, monomers where the acid functional group may be an acid per se, such as a carboxylic acid, or a portion may be salt thereof, such as an alkali metal carboxylate. Useful acid functional polar monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, carboxyethyl (meth)acrylate, 2-sulfoethyl methacrylate, styrene sulfonic acid, 2-acrylamido-2-methyl-propanesulfonic acid, vinylphosphonic acid, and mixtures thereof. Due to their availability, acid functional polar monomers are generally selected from ethylenically unsaturated carboxylic acids, e.g., (meth)acrylic acids. When even stronger acids are desired, acidic polar monomers include the ethylenically unsaturated sulfonic acids and ethylenically unsaturated phosphonic acids may be used. The acid functional polar monomer is generally used in amounts of 1 to 15 parts by weight, preferably 1 to 10 parts by weight, based on 100 parts by weight total monomer.

A suitable monomer mixture may comprise: 50-99 parts by weight of alkyl (meth)acrylate monomers; and 1-50 parts by weight of polar monomers, (inclusive of acid-functional polar monomers); wherein the sum of the monomers is 100 parts by weight.

The polymerizable composition may optionally further comprise chain transfer agents to control the molecular weight of the resultant (meth)acrylate polymer. Examples of useful chain transfer agents include but are not limited to those selected from the group consisting of carbon tetrabromide, alcohols, mercaptans, and mixtures thereof. When present, the preferred chain transfer agents are isooctyl mercaptoacetate (e.g., commercially available from Evans Chemetics LP (Teaneck, NJ)) and carbon tetrabromide. The polymerizable composition to form a (meth)acrylic polymer may further comprise up to about 0.5 parts by weight of a chain transfer agent, typically about 0.01 to about 0.5 parts by weight, if used, preferably about 0.05 parts by weight to about 0.2 parts by weight, based upon 100 parts by weight of the total monomer mixture.

In certain embodiments a (meth)acrylic block copolymer may be used. Suitable (meth)acrylic block copolymers may have a block structure such as a di-block ((A-B) structure), a tri-block ((A-B-A) structure), a multi-block (-(A-B)n-structure), or a star block structure ((A-B)n-structure). Di-block, tri-block, and multi-block structures may also be classified as linear block copolymers. Star block copolymers fall into a general class of block copolymer structures having a branched structure. Star block copolymers are also referred to as radial or palmtree copolymers, as they have a central point from which branches extend. Block copolymers herein are to be distinguished from comb-type polymer structure and other branched copolymers. These other branched structures do not have a central point from which branches extend. The (meth)acrylic block copolymers can include any of the (meth)acrylic monomers described above. The (meth) acrylic block copolymer may comprise additional monomer units, for example, vinyl group monomers having carboxyl groups such as, e.g., (meth)acrylic acid, crotonic acid, maleic acid, maleic acid anhydride, fumaric acid, or (meth) acryl amide; aromatic vinyl group monomers such as, e.g., styrene, α-methyl styrene, or p-methyl styrene; conjugated diene group monomers such as, e.g., butadiene or isoprene; olefin group monomers such as, e.g., ethylene, or propylene; or lactone group monomers such as, e.g., ε-caprolactone or valero lactone; and combinations thereof. Example of (meth)acrylic block copolymer are available under the tradenames: Kurarity (available from Kuraray Chemical Corporation, Tokyo, Japan) and Nanostrength (available from Arkema, Colombes, France).

Methods of preparing the (meth)acrylic polymers for use in the core are not particularly limited; the (meth)acrylic polymer can be formed from the above-described polymerizable compositions by solution polymerization, emulsion polymerization, suspension polymerization, or bulk polymerization, as known to the skilled practitioner, for instance using typical polymerization initiation methods of ultraviolet radiation initiation and/or thermal initiation.

Additional Polymers

Poly(alpha-olefin) polymers, also referred to as poly(1-alkene) polymers, generally comprise an uncrosslinked polymer, which may have radiation activatable functional groups grafted thereon as described in U.S. Pat. No. 5,209, 971 (Babu et al.). The polymer is tacky and predominantly amorphous. Useful poly(alpha-olefin) polymers include, for example, $C_3$-$C_{18}$ poly(1-alkene) homopolymers and copolymers of propylene with $C_5$-$C_{12}$ 1-alkenes, such as $C_5$-$C_{12}$ poly(1-alkene) polymers and copolymers of propylene with $C_6$-$C_8$ 1-alkenes. Examples of poly(alpha-olefins) are available under the trade designations: Rexene (from Rextac LLC, Oddessa, Texas); Eastoflex (from Eastman Chemical Corp, Kingsport, Tennessee); and Vestoplast (Evonik, Essen, Germany).

Polyurethane is a generic term used to describe polymers prepared by the reaction of a polyfunctional isocyanate with a polyfunctional alcohol to form urethane linkages. The term "polyurethane" has also been used more generically to refer to the reaction products of polyisocyanates with any polyactive hydrogen compound including polyfunctional alcohols, amines, and mercaptans. The polyisocyanates may be linear or branched, aliphatic, cycloaliphatic, heterocyclic or aromatic or a combination thereof.

Silicone polymers include, for instance, a linear material described by the following formula illustrating a siloxane backbone with aliphatic and/or aromatic substituents:

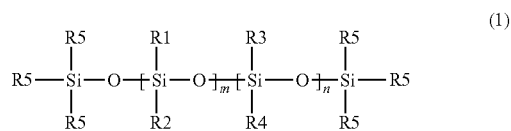

(1)

wherein R1, R2, R3, and R4 are independently selected from the group consisting of an alkyl group and an aryl group, each R5 is an alkyl group and n and m are integers, and at least one of m or n is not zero. In some embodiments, at least one of the alkyl or aryl groups may contain a halogen substituent (e.g., fluorine, for instance at least one of the alkyl groups may be —$CH_2CH_2C_4F_9$). In some embodiments, R5 is a methyl group (i.e., the nonfunctionalized silicone polymer is terminated by trimethylsiloxy groups). In some embodiments, R1 and R2 are alkyl groups and n is zero (i.e., the material is a poly(dialkylsiloxane)). In some embodiments, the alkyl group is a methyl group (i.e., poly(dimethylsiloxane) ("PDMS")). In some embodiments, R1 is an alkyl group, R2 is an aryl group, and n is zero (i.e., the material is a poly(alkylarylsiloxane)). In some embodiments, R1 is methyl group and R2 is a phenyl group (i.e., the polymer is poly(methylphenylsiloxane)). In some embodiments, R1 and R2 are alkyl groups and R3 and R4 are aryl groups (i.e., the polymer is a poly(dialkyldiarylsiloxane)). In some embodiments, R1 and R2 are methyl groups, and R3 and R4 are phenyl groups (i.e., the polymer is poly(dimethyldiphenylsiloxane) or poly(methylphenylsiloxane)). In some embodiments, the nonfunctionalized silicone polymers may be branched. For example, at least one of the R1, R2, R3, and/or R4 groups may be a linear or branched siloxane with alkyl or aryl (including halogenated alkyl or aryl) substituents and terminal R5 groups. As used herein, "nonfunctional groups" are either alkyl or aryl groups consisting of carbon, hydrogen, and in some embodiments, halogen (e.g., fluorine) atoms. As used herein, a "nonfunctionalized silicone material" is one in which the R1, R2, R3, R4, and R5 groups are nonfunctional groups.

Generally, functional silicone polymers include specific reactive groups attached to the siloxane backbone of the starting material (e.g., hydrogen, hydroxyl, vinyl, allyl, or acrylic groups). As used herein, a "functionalized silicone polymer" is one in which at least one of the R-groups of Formula 2 is a functional group.

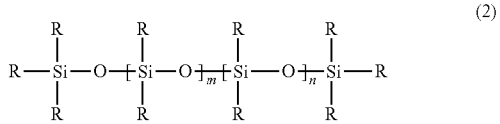

(2)

In some embodiments, a functional silicone polymer is one in which at least 2 of the R-groups are functional groups. Generally, the R-groups of Formula 2 may be independently selected. In some embodiments, the only functional groups present are hydroxyl groups (e.g., silanol terminated polysiloxanes (e.g., silanol terminated poly dimethyl siloxane)). In addition to functional R-groups, the R-groups may be nonfunctional groups (e.g., alkyl or aryl groups, including halogenated (e.g., fluorinated) alky and aryl groups). In some embodiments, at least one of the R groups may be a linear or branched siloxane with functional and/or nonfunctional substituents.

In embodiments in which the silicone polymer is non-tacky, a tackifier as described above may be included with the silicone polymer. A suitable tackifier resin often consists of a three dimensional silicate structure that is endcapped with trimethylsiloxy groups and silanol functionality. Suitable silicate tackifying resins are commercially available from sources such as Dow Corning (e.g., DC2-7066), and Momentive Performance Materials (e.g., SR545 and SR1000).

Sheath

From a physical performance perspective, the properties of the sheath should be considered. The sheath provides structural integrity to the core-sheath filament, as well as separating the adhesive core from coming into contact with itself or other surfaces. The presence of the sheath preferably does not affect final material adhesive performance, either by being sufficiently thin to contribute a relatively small amount of filler material to the adhesive material or by being formed of material that is a functional component of the adhesive. The sheath does need to be thick enough to support the filament form factor and preferably to allow for delivery of the core-sheath filament to a deposition location.

As noted above, the sheath material exhibits a melt flow index of less than 15 g/10 min. Such a low melt flow index is indicative of a sheath material that has sufficient strength to allow the core-sheath filament to withstand the physical manipulation required for handling, and optionally for use with an additive manufacturing apparatus. For instance, a core-sheath filament might need to be unwound from a spool, be introduced into an apparatus, and be advanced into a nozzle for melting, all without breakage of the core-sheath filament. In certain embodiments, the sheath material exhibits a melt flow index of 14 g/10 min or less, 13 g/10 min or less, 11 g/10 min or less, 10 g/10 min or less, 8 g/10 min or less, 7 g/10 min or less, 6 g/10 min or less, 5 g/10 min or less, 4 g/10 min or less, 3 g/10 min or less, 2 g/10 min or less, or 1 g/10 min or less. In addition to exhibiting strength, the sheath material is non-tacky. A material is non-tacky if it passes a "Self-Adhesion Test", in which the force required to peel the material apart from itself is at or less than a predetermining maximum threshold amount, without fracturing the material. The Self-Adhesion Test is described in the Examples below. Employing a non-tacky sheath allows the filament to be handled and optionally printed, without undesirably adhering to anything prior to deposition onto a substrate.

In certain embodiments, the sheath material exhibits a combination of at least two of low MFI (e.g., less than 15 g/10 min), moderate elongation at break (e.g., 100% or more as determined by ASTM D638-14 using test specimen Type IV), low tensile stress at break (e.g., 10 MPa or more as determined by ASTM D638-14 using test specimen Type IV), and moderate Shore D hardness (e.g., 30-70 as determined by ASTM D2240-15).

In many embodiments, to achieve the goals of providing structural integrity and a non-tacky surface, the sheath comprises a material selected from a styrenic block copolymer, a polyolefin, ethylene vinyl acetate, a polyurethane, a styrene butadiene copolymer, either alone or in combination of any two or more. In certain embodiments, the sheath comprises any one of these listed materials as the main component (e.g., the sheath may also include one or more additives). Example suitable styrenic block copolymers and styrene butadiene copolymers are as described in detail above with respect to the core.

Suitable polyolefins are not particularly limited. Suitable polyolefin resins include for example and without limitation, polypropylene (e.g., a polypropylene homopolymer, a polypropylene copolymer, and/or blends comprising polypropylene), polyethylene (e.g., a polyethylene homopolymer, a polyethylene copolymer, high density polyethylene (HDPE), medium density polyethylene (MDPE), low density polyethylene (LDPE)), and combinations thereof. For instance, suitable commercially available LDPE resins include PETROTHENE NA217000 available from LyondellBasell (Rotterdam, Netherlands) and MARLEX 1122 available from Chevron Phillips (The Woodlands, TX).

The term "polyurethane" as used herein applies to polymers made from the reaction product of a compound containing at least two isocyanate groups (—N=C=O), referred to herein as "isocyanates", and a compound containing at least two active-hydrogen containing groups. Examples of active-hydrogen containing groups include primary alcohols, secondary alcohols, phenols and water. Other active-hydrogen containing groups include primary and secondary amines which react with the isocyanate to form a urea linkage, thereby making a polyurea. A wide variety of isocyanate-terminated materials and appropriate co-reactants are well known, and many are commercially available (see, for example, Gunter Oertel, "Polyurethane Handbook", Hanser Publishers, Munich (1985)). Suitable commercially available thermoplastic polyurethanes include for instance and without limitation, ESTANE 58213 and ESTANE ALR 87A available from the Lubrizol Corporation (Wickliffe, OH)

Suitable ethylene vinyl acetate (EVA) polymers (i.e., copolymers of ethylene with vinyl acetate) for use in the sheath include resins from DuPont (Wilmington, DE) available under the trade designation ELVAX. Typical grades range in vinyl acetate content from 9 to 40 weight percent and a melt flow index of as low as 0.03 grams per minute. (per ASTM D1238). Suitable EVAs also include high vinyl acetate ethylene copolymers from LyondellBasell (Houston, TX) available under the trade designation ULTRATHENE. Typical grades range in vinyl acetate content from 12 to 18 weight percent. Suitable EVAs also include EVA copolymers from Celanese Corporation (Dallas, TX) available under the trade designation ATEVA. Typical grades range in vinyl acetate content from 2 to 26 weight percent.

In select embodiments, the sheath comprises one or more materials that are functional components of the adhesive of the adhesive core. In such embodiments, the sheath typically comprises a styrene block copolymer or a styrene butadiene copolymer, or combinations thereof. Advantageously, when such a core-sheath filament is melted, mixed, and deposited on a substrate, the sheath material adds to the adhesive properties of the adhesive, as opposed to potentially detracting from the adhesive properties. Optionally, the only structural polymeric materials (e.g., components other than additives) included in the sheath are functional components; in such embodiments the sheath consists of one or more (e.g., polymeric) materials that are functional components of the adhesive of the adhesive core.

In other embodiments, the sheath includes one or more materials that are not functional components of the adhesive of the adhesive core. In such embodiments, the sheath material can act as a filler in the adhesive when the core-sheath filament is melted, mixed, and deposited on a substrate. When the sheath includes one or more materials that are not functional components of an adhesive, they are typically included in a low weight percentage of the total core-sheath filament, to minimize interference with the adhesive properties of the final adhesive. For example, in an embodiment, the sheath comprises HDPE in an amount of up to 5 wt. % of the total weight of the core-sheath filament.

Figure 3:
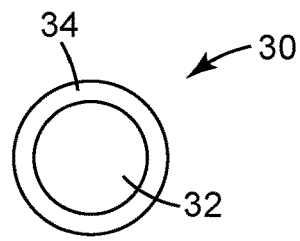
FIG. 3 is a schematic cross-sectional view of a core-sheath filament, according to an embodiment of the present disclosure.

The sheath typically makes up 4 wt. % or more of the total core-sheath filament, 5 wt. % or more, 6 wt. % or more, 7 wt. % or more, 8 wt. % or more, 9 wt. % or more, 10 wt. % or more, 12 wt. % or more, or 13 wt. % or more of the total weight of the core-sheath filament; and 20 wt. % or less, 18 wt. % or less, 16 wt. % or less, 14 wt. % or less, 12 wt. % or less, 10 wt. % or less, or 8 wt. % or less of the total weight of the core-sheath filament. Stated another way, the sheath can be present in an amount of 4 wt. % to 20 wt. % of the core-sheath filament, 5 to 20 wt. %, 5 to 14 wt. %, 5 to 10 wt. %, or 4 to 8 wt. % of the core-sheath filament. Referring to FIG. 3, a schematic cross-sectional view of a core-sheath filament 30 is provided, illustrating the typical presence of a greater amount of the core 32 than the sheath 34.

Additives

Core-sheath filaments described herein, in some instances, further comprise one or more additives, such as one or more additives selected from the group consisting of a filler, a plasticizer, an antioxidant, a pigment, a hindered amine light stabilizer, an ultraviolet light absorber, or combinations thereof. Typically, one or more additives are provided in the core due to its larger volume than the sheath, although in certain embodiments additive(s) can be included in the sheath of the core-sheath filament.

In some embodiments, the core-sheath filament can include an optional plasticizer. The plasticizer is often selected to be compatible with one or more blocks of a styrenic block copolymer. As with the tackifiers, compatibility between the plasticizer and one of the blocks is indicated by a change (e.g., a decrease) in the glass transition temperature of the block. In some embodiments, the plasticizer is selected from a naphthenic oil, a liquid (at room temperature) polybutene resin, a liquid (at room temperature) polyisobutylene resin, a liquid (at room temperature) paraffin, a liquid (at room temperature) isoprene polymer, or a phosphate ester.

Example napththenic oil plasticizers that can be added include, but are not limited to, those commercially available under the trade designation NYFELX (e.g., NYFLEX 222B) from Nynas Naphthenics AB (Stockholm, Sweden) and under the trade designation CALSOL (e.g., CALSOL 5550) from Calumet Specialty Products Partners (Indianapolis, IN, USA). Example liquid paraffin plasticizers that can be added include, but are not limited to, those commercially available under the trade designation FLEXON (e.g., FLEXON 845) from Exxon (Irving, TX, USA), under the trade designation KAYDOL from Paraffinic Sonneborn (Parsippany, NJ, USA), under the trade designation SUNPAR (e.g., SUNPAR 150) from Sunoco (Dallas, TX, USA), and under the trade designation TUFFLO (e.g., TUFFLO 6056) from CITGO (Houston, TX, USA). Example liquid polybutene plasticizers include, but are not limited to, those commercially available under the trade designation OPPANOL (e.g., OPPANOL B12 SNF) from BASF (Florham Park, NJ, USA) and under the trade designation INDOPOL (e.g., INDOPOL H-8) from Ineos Oligomers Products (League City, TX, USA). Example phosphate esters include, but are not limited to, those commercially available under the trade designation SANTICIZER (e.g., SANTICIZER 141) from Valtris Specialty Chemicals (Independence, OH, USA).

A core-sheath filament described herein optionally also comprises one or more hindered amine light stabilizers, ultraviolet light absorbers, or combinations thereof. For instance, any antioxidant not inconsistent with the objectives of the present disclosure may be used. In some embodiments, for example, suitable anti-oxidants include various aryl compounds, including butylated hydroxytoluene (BHT). In some embodiments, one or more anti-oxidants, if used, are present in an amount of about 0.001-2% by weight, 0.001 to 1% by weight, or 0.01-1% by weight, based on the total weight of the core-sheath filament. Further, if used, a stabilizing agent is present in an amount of about 0.1-5% by weight, about 0.5-4% by weight, or about 1-3% by weight, based on the total weight of the core-sheath filament.

A core-sheath filament as described herein can also comprise one or more ultraviolet light absorbers (e.g., dyes, optical brighteners, pigments, particulate fillers, etc.), such as TINOPAL OB, a benzoxazole, 2,2'-(2,5-thiophenediyl) bis[5-(1,1-dimethylethyl)], available from BASF Corporation, Florham Park, NJ. The ultraviolet light absorber, if used, can be present in an amount of about 0.001-5% by weight, about 0.01-1% by weight, about 0.1-3% by weight, or about 0.1-1% by weight, based on the total weight of the core-sheath filament.

Core-sheath filaments may include fillers, such as glass bubbles, expandable microspheres, silica, carbon, calcium carbonate, clay, talc, titanium dioxide, surface-treated silica, conductive particles, graphite, resin particles, kaolin, glass fibers, or combinations thereof. Examples of suitable fillers are naturally occurring or synthetic materials including, but not limited to: silica ($SiO_2$ (e.g., quartz)); alumina ($Al_2O_3$), zirconia, nitrides (e.g., silicon nitride); glasses and fillers derived from, for example, Zr, Sr, Ce, Sb, Sn, Ba, Zn, and Al; feldspar; borosilicate glass; kaolin (china clay); talc; zirconia; titania; and submicron silica particles (e.g., pyrogenic silicas such as those available under the trade designations AEROSIL, including "OX 50," "130," "150" and "200" silicas from Degussa Corp., Akron, Ohio and CAB-O-SIL M5 and TS-720 silica from Cabot Corp., Tuscola, IL). Organic fillers made from polymeric materials are also possible, such as those disclosed in International Publication No. WO09/045752 (Kalgutkar et al.).

In certain embodiments, the filler comprises surface modified nanoparticles. Generally, "surface modified nanoparticles" comprise surface treatment agents attached to the surface of a core. In some embodiments, the core is substantially spherical. In some embodiments, the nanoparticle core is at least partially or substantially crystalline. In some embodiments, the particles are substantially non-agglomerated. In some embodiments, the particles are substantially non-aggregated in contrast to, for example, fumed or pyrogenic silica. Generally, surface treatment agents for silica nanoparticles are organic species having a first functional group capable of covalently chemically attaching to the surface of a nanoparticle, wherein the attached surface treatment agent alters one or more properties of the nanoparticle. In some embodiments, surface treatment agents have no more than three functional groups for attaching to the core. In some embodiments, the surface treatment agents have a low molecular weight, e.g., a weight average molecular weight less than 1000 gm/mole.

In some embodiments, the surface-modified nanoparticles are reactive; that is, at least one of the surface treatment agents used to surface modify the nanoparticles of the present disclosure may include a second functional group capable of reacting with one or more of the components of the adhesive core. Surface treatment agents often include more than one first functional group capable of attaching to the surface of a nanoparticle. For example, alkoxy groups are common first functional groups that are capable of reacting with free silanol groups on the surface of a silica nanoparticle forming a covalent bond between the surface treatment agent and the silica surface. Examples of surface treatment agents having multiple alkoxy groups include trialkoxy alkylsilanes (e.g., 3-(trimethoxysilyl)propyl methacrylate) and trialkoxy arylsilanes (e.g., trimethoxy phenyl silane).

The core-sheath filament may further contain fibrous reinforcement. Suitable glass fibers, for instance, include aluminoborosilicate glass fibers, which contain less than about 2% alkali or are substantially free of alkali (i.e., "E-glass" fibers). E-glass fibers are available from numerous commercial suppliers.

The core-sheath filament may additionally contain colorants such as dyes, pigments, and pigment dyes. Examples of suitable colorants as described in U.S. Pat. No. 5,981,621 (Clark et al.) include 1-hydroxy-4-[4-methylphenylamino]-9,10-anthracenedione (FD&C violet No. 2); disodium salt of 6-hydroxy-5[(4-sulfophenyl)oxo]-2-naphthalenesulfonic acid (FD&C Yellow No. 6); 9-(o-carboxyphenyl)-6-hydroxy-2,4,5,7-tetraiodo-3H-xanthen-3-one, disodium salt, monohydrate (FD&C Red No. 3); and the like.

Examples of useful pigments include, without limitation: white pigments, such as titanium oxide, zinc phosphate, zinc sulfide, zinc oxide and lithopone; red and red-orange pigments, such as iron oxide (maroon, red, light red), iron/chrome oxide, cadmium sulfoselenide and cadmium mercury (maroon, red, orange); ultramarine (blue, pink and violet), chrome-tin (pink) manganese (violet), cobalt (violet); orange, yellow and buff pigments such as barium titanate, cadmium sulfide (yellow), chrome (orange, yellow), molybdate (orange), zinc chromate (yellow), nickel titanate (yellow), iron oxide (yellow), nickel tungsten titanium, zinc ferrite and chrome titanate; brown pigments such as iron oxide (buff, brown), manganese/antimony/titanium oxide, manganese titanate, natural siennas (umbers), titanium tungsten manganese; blue-green pigments, such as chrome aluminate (blue), chrome cobalt-alumina (turquoise), iron blue (blue), manganese (blue), chrome and chrome oxide (green) and titanium green; as well as black pigments, such as iron oxide black and carbon black. Combinations of pigments are generally used to achieve the desired color tone in the core-sheath filament or in a printed adhesive. The use of florescent dyes and pigments can also be beneficial in enabling the printed composition to be viewed under black-light. A particularly useful hydrocarbon soluble fluorescing dye is 2,5-bis(5-tert-butyl-2-benzoxazolyl) 1 thiophene. Fluorescing dyes, such as rhodamine, may also be bound to cationic polymers and incorporated as part of the filament.

In certain embodiments, colorant(s) are included in the core to impart a certain color (e.g., yellow) and colorant(s) are included in the core to impart a certain different color (e.g., blue), such that a color (e.g., green) of a printed adhesive can be observed to readily demonstrate effective mixing of the core and sheath materials. In select embodiments, colorant(s) can be included in the core and/or sheath portions of the filament to provide color matching of a printed adhesive with a substrate on which it is printed or with another material included in an end use, such that the presence of the printed adhesive is less visibly noticeable after printing than if the core-sheath filament did not contain the colorant(s).

Combinations of any of the above additives may also be employed. The selection and amount of any one such additive can be selected by one of skill in the art to accomplish the desired result without undue experimentation.

Methods

In a second aspect, a method of printing an adhesive is provided. The method comprises:

a. melting a core-sheath filament comprising an adhesive core and a non-tacky sheath in a nozzle to form a molten composition; and b. dispensing the molten composition through the nozzle onto a substrate;

wherein steps a. and b. are carried out one or more times to form a printed adhesive.

Typically, the molten composition is mixed in the nozzle, during dispensing through the nozzle, or both. The nozzle is often part of a 3D printer. In certain embodiments, however, the method can further include a separate step of mixing the molten composition prior to step b.

Fused Filament Fabrication, which is also known under the trade designation "FUSED DEPOSITION MODELING" from Stratasys, Inc., Eden Prairie, Minn., is a process that uses a thermoplastic strand fed through a hot can to produce a molten aliquot of material from an extrusion head. The extrusion head extrudes a bead of material in 3D space as called for by a plan or drawing (e.g., a computer aided drawing (CAD file)). The extrusion head typically lays down material in layers, and after the material is deposited, it fuses.

One suitable method for printing a core-sheath filament comprising an adhesive onto a substrate is a continuous non-pumped filament fed dispense unit. In such a method, the dispensing throughput is regulated by a linear feed rate of the core-sheath filament allowed into the dispense head. In most currently commercially available FFF dispensing heads, an unheated filament is mechanically pushed into a heated zone, which provides sufficient force to push the filament out of a nozzle. A variation of this approach is to incorporate a conveying screw in the heated zone, which acts to pull in a filament from a spool and also to create pressure to dispense the material through a nozzle. Although addition of the conveying screw into the dispense head adds cost and complexity, it does allow for increased throughput, as well as the opportunity for a desired level of component mixing and/or blending. A characteristic of filament fed dispensing is that it is a true continuous method, with only a short segment of filament in the dispense head at any given point.

There can be a number of benefits of filament fed dispensing as compared to traditional hot melt adhesive deposition. First, filament fed dispensing allows for quicker changeover of different adhesives. Also, it does not operate in a semi-batch mode with melting tanks, and this minimizes the opportunity for thermal degradation of an adhesive and associated defects in the deposited adhesive. Filament fed dispensing can use materials with higher melt viscosity, which affords an adhesive bead that can be deposited with greater geometric precision and stability without requiring a separate curing or crosslinking step. In addition, higher molecular weight raw materials can be used within the adhesive because of the higher allowable melt viscosity. This is advantageous because uncured hot melt pressure sensitive adhesives containing higher molecular weight raw materials can have significantly improved high temperature holding power while maintaining stress dissipation capabilities.

The form factor for FFF filaments is usually a concern. For instance, consistent cross-sectional shape and diameter assist in cross-compatibility of the core-sheath filaments with existing standardized FFF filaments such as ABS or polylactic acid (PLA). In addition, consistent cross-section diameter helps to ensure the proper throughput of adhesive because the FFF dispense rate is generally determined by the feed rate of the linear length of a filament. Suitable cross-sectional variance of the core-sheath filament according to at least certain embodiments when used in FFF includes a maximum variation of diameter of 20% over a length of 50 cm, or even a maximum variation in diameter of 15% over a length of 50 cm.

Extrusion-based layered deposition systems (e.g., fused filament fabrication systems) are useful for making articles including printed adhesives in methods of the present disclosure. Deposition systems having various extrusion types of are commercially available, including single screw extruders, twin screw extruders, hot-end extruders (e.g., for filament feed systems), and direct drive hot-end extruders (e.g., for elastomeric filament feed systems). The deposition systems can also have different motion types for the deposition of a material, including using XYZ stages, gantry cranes, and robot arms. Common manufacturers of additive manufacturing deposition systems include Stratasys, Ultimaker, MakerBot, Airwolf, WASP, MarkForged, Prusa, Lulzbot, BigRep, Cosin Additive, and Cincinnati Incorporated. Suitable commercially available deposition systems include for instance and without limitation, BAAM, with a pellet fed screw extruder and a gantry style motion type, available from Cincinnati Incorporated (Harrison, OH); BETABRAM Model P1, with a pressurized paste extruder and a gantry style motion type, available from Interelab d.o.o. (Senovo, Slovenia); AM1, with either a pellet fed screw extruder or a gear driven filament extruder as well as a XYZ stages motion type, available from Cosine Additive Inc. (Houston, TX); KUKA robots, with robot arm motion type, available from KUKA (Sterling Heights, MI); and AXIOM, with a gear driven filament extruder and XYZ stages motion type, available from AirWolf 3D (Fountain Valley, CA).

Three-dimensional articles including a printed adhesive can be made, for example, from computer-aided design (CAD) models in a layer-by-layer manner by extruding a molten adhesive onto a substrate. Movement of the extrusion head with respect to the substrate onto which the adhesive is extruded is performed under computer control, in accordance with build data that represents the final article. The build data is obtained by initially slicing the CAD model of a three-dimensional article into multiple horizontally sliced layers. Then, for each sliced layer, the host computer generates a build path for depositing roads of the composition to form the three-dimensional article having a printed adhesive thereon. In select embodiments, the printed adhesive comprises at least one groove formed on a surface of the printed adhesive. Optionally, the printed adhesive forms a discontinuous pattern on the substrate.

The substrate onto which the molten adhesive is deposited is not particularly limited. In many embodiments, the substrate comprises a polymeric part, a glass part, or a metal part. Use of additive manufacturing to print an adhesive on a substrate may be especially advantageous when the substrate has a non-planar surface, for instance a substrate having an irregular or complex surface topography.

The core-sheath filament can be extruded through a nozzle carried by an extrusion head and deposited as a sequence of roads on a substrate in an x-y plane. The extruded molten adhesive fuses to previously deposited molten adhesive as it solidifies upon a drop in temperature. This can provide at least a portion of the printed adhesive. The position of the extrusion head relative to the substrate is then incremented along a z-axis (perpendicular to the x-y plane), and the process is repeated to form at least a second layer of the molten adhesive on at least a portion of the first layer. Changing the position of the extrusion head relative to the deposited layers may be carried out, for example, by lowering the substrate onto which the layers are deposited. The process can be repeated as many times as necessary to form a three-dimensional article including a printed adhesive resembling the CAD model. Further details can be found, for example, Turner, B. N. et al., "A review of melt extrusion additive manufacturing processes: I. process design and modeling"; *Rapid Prototyping Journal* 20/3 (2014) 192-204. In certain embodiments, the printed adhesive comprises an integral shape that varies in thickness in an axis normal to the substrate. This is particularly advantageous in instances where a shape of adhesive is desired that cannot be formed using die cutting of an adhesive.

A number of fused filament fabrication 3D printers may be useful for carrying out the method according to the present disclosure. Many of these are commercially available under the trade designation "FDM" from Stratasys, Inc., Eden Prairie, MN, and subsidiaries thereof. Desktop 3D printers for idea and design development and larger printers for direct digital manufacturing can be obtained from Stratasys and its subsidiaries, for example, under the trade designations "MAKERBOT REPLICATOR", "UPRINT", "MOJO", "DIMENSION", and "FORTUS". Other 3D printers for fused filament fabrication are commercially available from, for example, 3D Systems, Rock Hill, SC, and Airwolf 3D, Costa Mesa, CA.

FIG. 1 is a sectional view of an embodiment of an extrusion head 10 useful in a method of printing an adhesive of the present disclosure. The extrusion head 10 includes an extrusion channel 12, a heating block 14, and an extrusion tip 16. A plurality of ports 18 in the heating block 14 may be useful, for example, for measurement and control of the temperature of the heating block 14 as needed. The extrusion head 10 can be a component, for example, of an extrusion-based layered deposition system, including those described in any of the above embodiments.

The extrusion channel 12 is a channel extending through the heating block 14 for feeding a core-sheath filament. The heating block 14 is useful for at least partially melting the core-sheath filament to a desired extrusion viscosity based on a suitable thermal profile along the heating block 14. The temperature of the heating block 14 can be adjusted based on the melting temperature and melt viscosity of the adhesive.

In some embodiments, the heating block is heated at a temperature of at least 180° C., at least 200° C., at least 220° C., up to about 300° C. or 275° C. Examples of suitable heating blocks 14 include those commercially available in "FUSED DEPOSITION MODELING" systems under the trademark "FDM TITAN" from Stratasys, Inc.

The extrusion tip 16 is the tip extension of the extrusion channel 12, which shears and extrudes the composition in molten form to deposit the molten mixture on a substrate. The size and shape of the extrusion tip may be designed as desired for the size and shape of the extruded roads of the adhesive. The extrusion tip 16 has tip inner dimensions useful for depositing roads of the adhesive, where the road widths and heights are based in part on the tip inner dimensions. In some embodiments, the extrusion tip has a round opening. In some of these embodiments, suitable tip inner diameters for the extrusion tip 16 can range from about 100 micrometers to about 1000 micrometers. In some dimensions, the extrusion tip has a square or rectangular opening. In some of these embodiments, the extrusion tip can have at least one of a width or a thickness ranging from about 100 micrometers to about 1,000 micrometers. In some embodiments, the extrusion tip 16 can be useful for forming droplets of extruded material.

In certain embodiments, the method further comprises mixing the molten composition (e.g., mechanically) prior to dispensing the molten composition. In other embodiments, the process of being melted in and dispensed through the nozzle may provide sufficient mixing of the composition such that the molten composition is mixed in the nozzle, during dispensing through the nozzle, or both.

The temperature of the substrate onto which the adhesive can be deposited may also be adjusted to promote the fusing of the roads of the deposited adhesive. In the method according to the present disclosure, the temperature of the substrate may be, for example, at least about 100° C., 110° C., 120° C., 130° C., or 140° C. up to 175° C. or 150° C.

Volatile organic compound (VOC) reduction regulations have become increasingly important, in particular for various kind of interior applications (occupational hygiene and occupational safety), such as, e.g., in the construction market or in the automotive or electronics industries. Advantageously, in certain embodiments, the printed adhesive provides the benefit of exhibiting a VOC value of 1000 ppm or less.

The printed adhesive may pass the Static Shear Strength Test, which is described in detail in the Examples below. A core-sheath filament can thus be formulated to provide a printed adhesive that has sufficient static shear to pass the Static Shear Strength Test for applications in which a minimum amount of static shear is required.

The printed adhesive prepared by the method according to the present disclosure may be an article useful in a variety of industries, for example, the aerospace, apparel, architecture, automotive, business machines products, consumer, defense, dental, electronics, educational institutions, heavy equipment, jewelry, medical, and toys industries.

Data representing an article (e.g., including a printed adhesive) may be generated using computer modeling such as computer aided design (CAD) data. Image data representing the (e.g., polymeric) article design can be exported in STL format, or in any other suitable computer processable format, to the additive manufacturing equipment. Scanning methods to scan a three-dimensional object may also be employed to create the data representing the article. One exemplary technique for acquiring the data is digital scanning Any other suitable scanning technique may be used for scanning an article, including X-ray radiography, laser scanning, computed tomography (CT), magnetic resonance imaging (MRI), and ultrasound imaging. Other possible scanning methods are described, e.g., in U.S. Patent Application Publication No. 2007/0031791 (Cinader, Jr., et al.). The initial digital data set, which may include both raw data from scanning operations and data representing articles derived from the raw data, can be processed to segment an article design from any surrounding structures (e.g., a support for the article). Methods according to the present disclosure may include an article that is partially or completely formed by additive manufacturing, or may include an article that is formed by other methods and includes a printed adhesive deposited onto a portion of the article (e.g., a substrate) using additive manufacturing methods.

Figure 10:
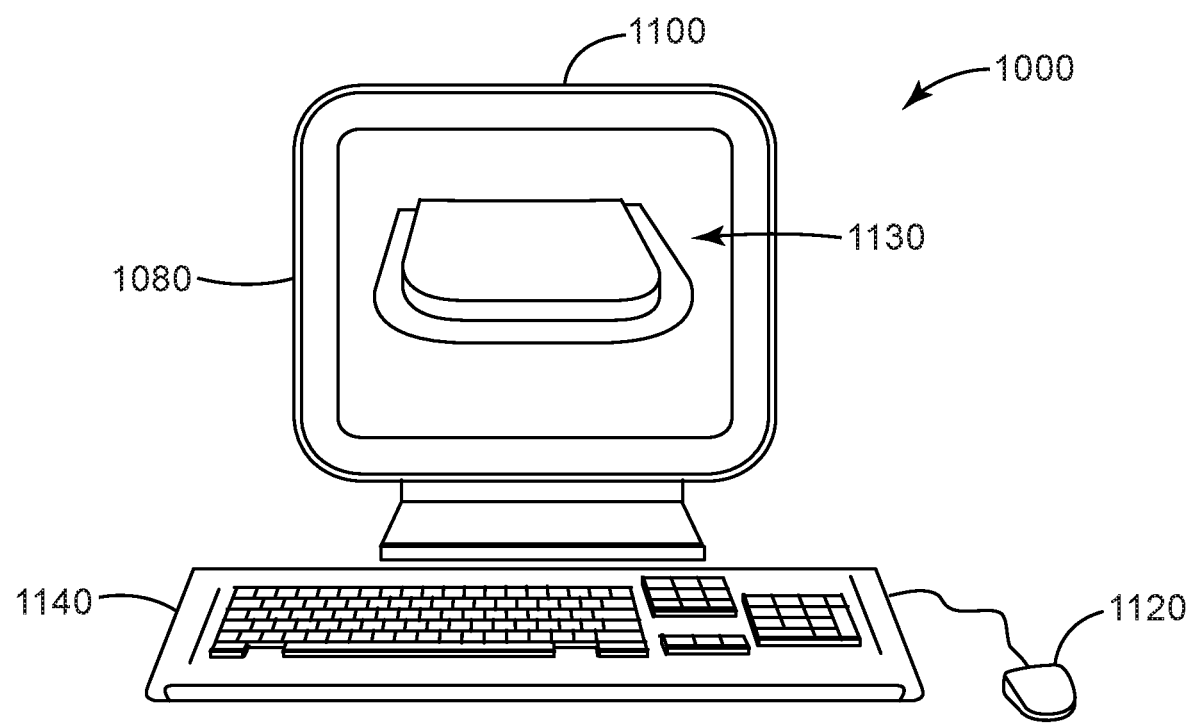
FIG. 10 is a schematic front view of an exemplary computing device 1000.

Often, machine-readable media are provided as part of a computing device. The computing device may have one or more processors, volatile memory (RAM), a device for reading machine-readable media, and input/output devices, such as a display, a keyboard, and a pointing device. Further, a computing device may also include other software, firmware, or combinations thereof, such as an operating system and other application software. A computing device may be, for example, a workstation, a laptop, a personal digital assistant (PDA), a server, a mainframe or any other general-purpose or application-specific computing device. A computing device may read executable software instructions from a computer-readable medium (such as a hard drive, a CD-ROM, or a computer memory), or may receive instructions from another source logically connected to computer, such as another networked computer. Referring to FIG. 10, a computing device 1000 often includes an internal processor 1080, a display 1100 (e.g., a monitor), and one or more input devices such as a keyboard 1140 and a mouse 1120. In FIG. 10, a printed adhesive 1130 is shown on the display 1100.

Figure 6:
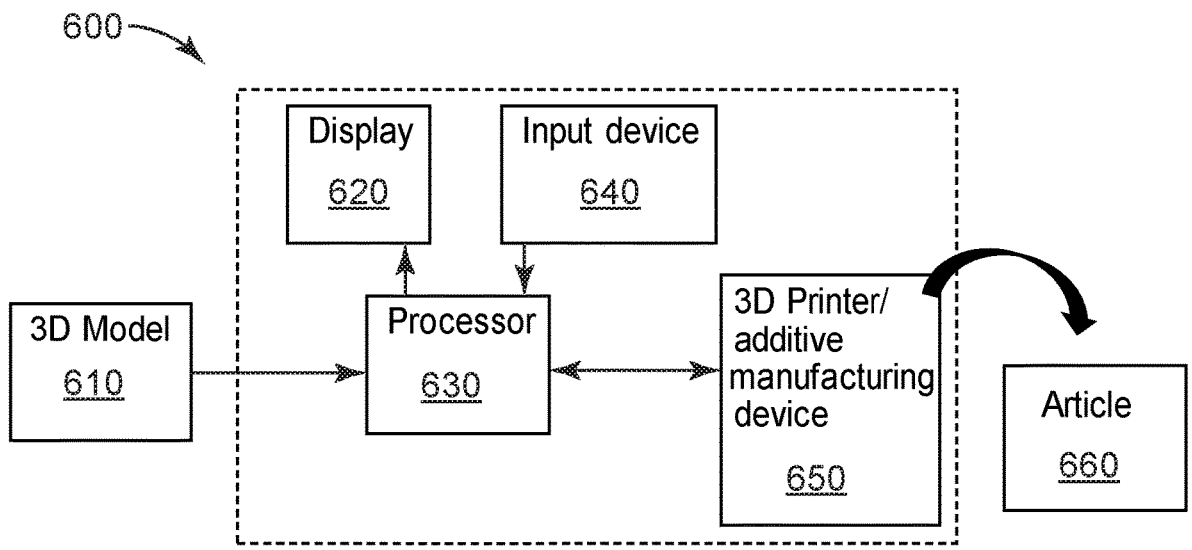
FIG. 6 is a block diagram of a generalized system 600 for additive manufacturing of an article.

Referring to FIG. 6, in certain embodiments, the present disclosure provides a system 600. The system 600 comprises a display 620 that displays a 3D model 610 of an article (e.g., comprising a printed adhesive 1130 as shown on the display 1100 of FIG. 10); and one or more processors 630 that, in response to the 3D model 610 selected by a user, cause a 3D printer/additive manufacturing device 650, using a core-sheath filament, to create a physical object of the article 660 comprising a printed adhesive. Often, an input device 640 (e.g., keyboard and/or mouse) is employed with the display 620 and the at least one processor 630, particularly for the user to select the 3D model 610. The core-sheath filament comprises an adhesive core and a non-tacky sheath.

Figure 7:
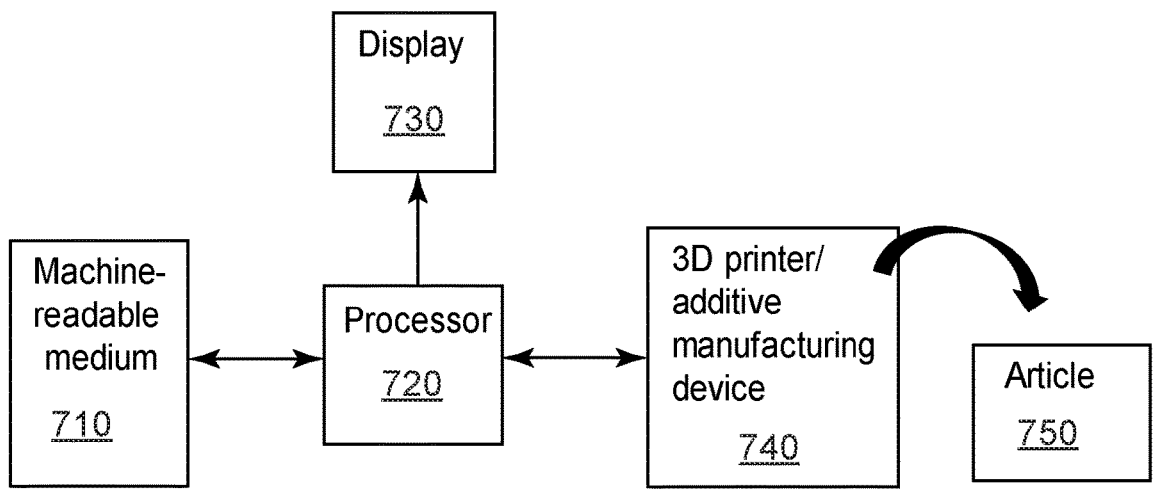
FIG. 7 is a block diagram of a generalized manufacturing process for an article.

Referring to FIG. 7, a processor 720 (or more than one processor) is in communication with each of a machine-readable medium 710 (e.g., a non-transitory medium), a 3D printer/additive manufacturing device 740, and optionally a display 730 for viewing by a user. The 3D printer/additive manufacturing device 740 is configured to make one or more articles 750 based on instructions from the processor 720 providing data representing a 3D model of the article 750 (e.g., comprising a printed adhesive 1130 as shown on the display 1100 of FIG. 10) from the machine-readable medium 710.

Figure 8:
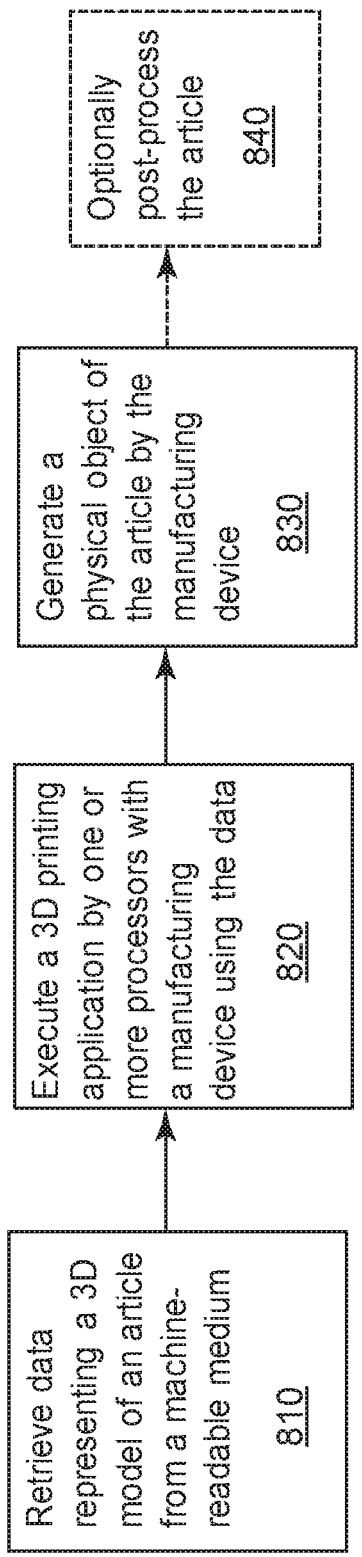
FIG. 8 is a high-level flow chart of an exemplary article manufacturing process.
Figure 9:
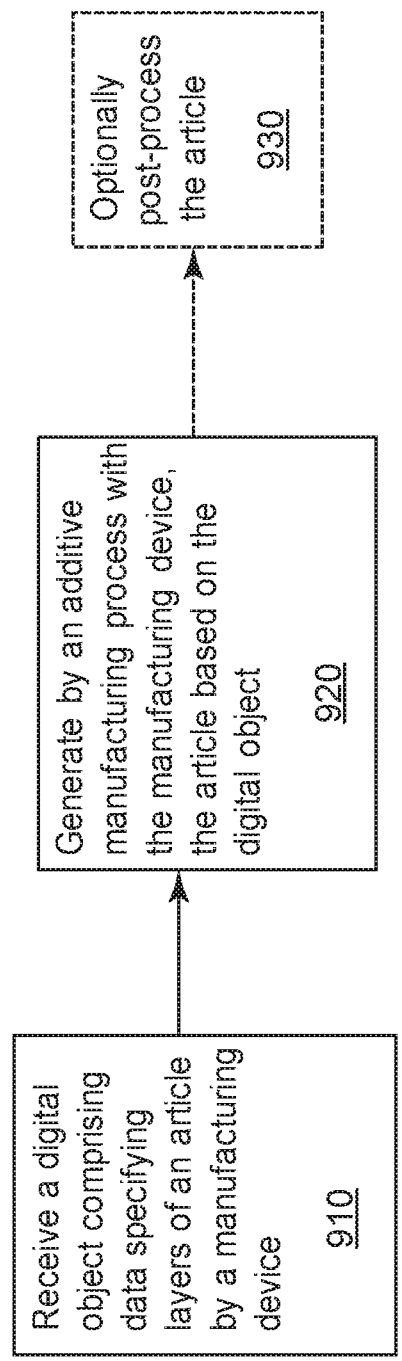
FIG. 9 is a high-level flow chart of an exemplary article additive manufacturing process.

Referring to FIG. 8, for example and without limitation, an additive manufacturing method comprises retrieving 810, from a (e.g., non-transitory) machine-readable medium, data representing a 3D model of an article including a printed adhesive. The method further includes executing 820, by one or more processors, an additive manufacturing application interfacing with a manufacturing device using the data and a core-sheath filament; and generating 830, by the manufacturing device, a physical object of the article including a printed adhesive. The additive manufacturing equipment can selectively deposit a molten adhesive onto a substrate to form a printed adhesive. The core-sheath filament comprises an adhesive core and a non-tacky sheath. Optionally, the article can be post-processed 840, such as by placing another substrate in contact with the printed adhesive to adhere the two substrates together. Additionally, referring to FIG. 9, a method of making an article comprises receiving 910, by a manufacturing device having one or more processors, a digital object comprising data specifying a plurality of layers of an article including a printed adhesive; and generating 920, with the manufacturing device by an additive manufacturing process using a core-sheath filament, the article based on the digital object. Optionally, the article can be post-processed 930.

SELECT EMBODIMENTS OF THE DISCLOSURE

Embodiment 1 is a core-sheath filament. The core-sheath filament includes an adhesive core and a non-tacky sheath. The sheath exhibits a melt flow index of less than 15 grams per 10 minutes (g/10 min).

Embodiment 2 is the core-sheath filament of embodiment 1, wherein the core comprises a pressure sensitive adhesive.

Embodiment 3 is the core-sheath filament of embodiment 1 or embodiment 2, wherein the core includes a styrenic block copolymer and a tackifier.

Embodiment 4 is the core-sheath filament of embodiment 3, wherein the styrenic block copolymer comprises a copolymer of a (meth)acrylate with a styrene macromer.

Embodiment 5 is the core-sheath filament of embodiment 3 or embodiment 4, wherein the core includes two or more styrenic block copolymers.

Embodiment 6 is the core-sheath filament of embodiment 1 or embodiment 2, wherein the core includes a (meth) acrylic polymer.

Embodiment 7 is the core-sheath filament of any of embodiments 1 to 6, wherein the core further includes at least one additive selected from a filler, a plasticizer, an antioxidant, a pigment, a hindered amine light stabilizer, an ultraviolet light absorber, or combinations thereof.

Embodiment 8 is the core-sheath filament of embodiment 7, wherein the filler includes glass bubbles, expandable microspheres, silica, carbon, calcium carbonate, clay, talc, titanium dioxide, surface-treated silica, conductive particles, graphite, resin particles, kaolin, glass fibers, or combinations thereof.

Embodiment 9 is the core-sheath filament of any of embodiments 1 to 8, wherein the sheath includes a styrenic block copolymer, a polyolefin, ethylene vinyl acetate, a polyurethane, a styrene butadiene copolymer, or combinations thereof.

Embodiment 10 is the core-sheath filament of any of embodiments 1 to 9, wherein the sheath includes one or more materials that are functional components of the adhesive of the adhesive core.

Embodiment 11 is the core-sheath filament of any of embodiments 1 to 10, wherein the sheath consists of one or more materials that are functional components of the adhesive of the adhesive core.

Embodiment 12 is the core-sheath filament of any of embodiments 1 to 11, wherein the sheath includes high density polyethylene (HDPE) in an amount of up to 5 weight percent (wt. %) of the total weight of the core-sheath filament.

Embodiment 13 is the core-sheath filament of any of embodiments 1 to 12, wherein the filament has an average diameter of 1 to 10 millimeters (mm), inclusive.

Embodiment 14 is the core-sheath filament of any of embodiments 1 to 13, wherein the filament has an average diameter of 2 to 6 mm, inclusive.

Embodiment 15 is the core-sheath filament of any of embodiments 1 to 14, wherein the filament has an average diameter of about 3 mm.

Embodiment 16 is the core-sheath filament of any of embodiments 1 to 15, wherein the sheath exhibits an elongation at break of 60 percent (%) or more.

Embodiment 17 is the core-sheath filament of any of embodiments 1 to 16, wherein the sheath exhibits an elongation at break of 90% or more.

Embodiment 18 is the core-sheath filament of any of embodiments 1 to 17, wherein when the filament is melted and the core and sheath are mixed together to form a mixture, the mixture exhibits a glass transition temperature ($T_g$) of 0° C. or less.

Embodiment 19 is the core-sheath filament of any of embodiments 1 to 18, wherein the filament has a maximum variation of diameter of 20% over a length of 50 centimeters (cm).

Embodiment 20 is the core-sheath filament of any of embodiments 1 to 19, wherein the sheath exhibits a melt flow index of 13 g/10 min or less, 10 g/10 min or less, 8 g/10 min or less, 5 g/10 min or less, or 2 g/10 min or less.

Embodiment 21 is a method of printing an adhesive. The method includes a) melting a core-sheath filament in a nozzle to form a molten composition, and b) dispensing the molten composition through the nozzle onto a substrate. Steps a) and b) are carried out one or more times to form a printed adhesive. The core-sheath filament includes an adhesive core and a non-tacky sheath.

Embodiment 22 is the method of embodiment 21, further including mixing the molten composition prior to step b.

Embodiment 23 is the method of embodiment 21, wherein the molten composition is mixed in the nozzle, during dispensing through the nozzle, or both.

Embodiment 24 is the method of any of embodiments 21 to 23, wherein the printed adhesive has an integral shape that varies in thickness in an axis normal to the substrate.

Embodiment 25 is the method of any of embodiments 21 to 24, wherein the printed adhesive has at least one groove formed on a surface of the printed adhesive.

Embodiment 26 is the method of any of embodiments 21 to 25, wherein the substrate includes a polymeric part, a glass part, or a metal part.

Embodiment 27 is the method of any of embodiments 21 to 26, wherein the printed adhesive exhibits a Volatile Organic Compound (VOC) value of 1000 ppm or less.

Embodiment 28 is the method of any of embodiments 21 to 27, wherein the printed adhesive passes the Static Shear Strength Test.

Embodiment 29 is the method of any of embodiments 21 to 28, wherein the printed adhesive forms a discontinuous pattern on the substrate.

Embodiment 30 is the method of any of embodiments 21 to 29, wherein the nozzle is part of a 3D printer.

Embodiment 31 is the method of any of embodiments 21 to 30, wherein the adhesive core includes a pressure sensitive adhesive.

Embodiment 32 is the method of any of embodiments 21 to 31, wherein the adhesive core includes a styrenic block copolymer and a tackifier.

Embodiment 33 is the method of embodiment 32, wherein the styrenic block copolymer comprises a copolymer of a (meth)acrylate with a styrene macromer.

Embodiment 34 is the method of embodiment 32 or embodiment 33, wherein the adhesive core includes two or more styrenic block copolymers.

Embodiment 35 is the method of any of embodiments 21 to 31, wherein the adhesive core includes a (meth)acrylic polymer.

Embodiment 36 is the method of any of embodiments 21 to 35, wherein the adhesive core further includes at least one additive selected from a filler, a plasticizer, an antioxidant, a pigment, a hindered amine light stabilizer, an ultraviolet light absorber, or combinations thereof.

Embodiment 37 is the method of embodiment 36, wherein the filler includes glass bubbles, expandable microspheres, silica, carbon, calcium carbonate, clay, talc, titanium dioxide, surface-treated silica, conductive particles, graphite, resin particles, kaolin, glass fibers, or combinations thereof.

Embodiment 38 is the method of any of embodiments 21 to 37, wherein the non-tacky sheath includes a styrenic block copolymer, a polyolefin, ethylene vinyl acetate, a polyurethane, a styrene butadiene copolymer, or combinations thereof.

Embodiment 39 is the method of any of embodiments 21 to 38, wherein the non-tacky sheath includes one or more materials that are functional components of the adhesive of the adhesive core.

Embodiment 40 is the method of any of embodiments 21 to 39, wherein the non-tacky sheath consists of one or more materials that are functional components of the adhesive of the adhesive core.

Embodiment 41 is the method of any of embodiments 21 to 40, wherein the non-tacky sheath includes high density polyethylene (HDPE) in an amount of up to 5 weight percent (wt. %) of the total weight of the core-sheath filament.

Embodiment 42 is the method of any of embodiments 21 to 41, wherein the filament has an average diameter of 1 to 10 millimeters (mm), inclusive.

Embodiment 43 is the method of any of embodiments 21 to 42, wherein the filament has an average diameter of 2 to 6 mm, inclusive.

Embodiment 44 is the method of any of embodiments 21 to 43, wherein the filament has an average diameter of about 3 mm.

Embodiment 45 is the method of any of embodiments 21 to 44, wherein the sheath exhibits an elongation at break of 60% or more.

Embodiment 46 is the method of any of embodiments 21 to 45, wherein the sheath exhibits an elongation at break of 90% or more.

Embodiment 47 is the method of any of embodiments 21 to 46, wherein when the filament is melted and the core and sheath are mixed together to form a mixture, the mixture exhibits a glass transition temperature ($T_g$) of 0° C. or less.

Embodiment 48 is the method of any of embodiments 21 to 47, wherein the filament has a maximum variation of diameter of 20% over a length of 50 cm.

Embodiment 49 is the method of any of claims 21 to 48, wherein the non-tacky sheath exhibits a melt flow index of 14 g/10 min or less, 10 g/10 min or less, 8 g/10 min or less, 5 g/10 min or less, or 2 g/10 min or less.

Embodiment 50 is a non-transitory machine readable medium. The non-transitory machine readable medium has data representing a three-dimensional model of an article, when accessed by one or more processors interfacing with a 3D printer, causes the 3D printer, using a core-sheath filament, to create an article including a printed adhesive. The core-sheath filament includes an adhesive core and a non-tacky sheath.

Embodiment 51 is a method. The method includes (a) retrieving, from a non-transitory machine readable medium, data representing a 3D model of an article; (b) executing, by one or more processors, a 3D printing application interfacing with a manufacturing device using the data; and (c) generating, by the manufacturing device, using a core-sheath filament, a physical object of the article, the article including a printed adhesive. The core-sheath filament includes an adhesive core and a non-tacky sheath.

Embodiment 52 is an article generated using the method of embodiment 51.

Embodiment 53 is the article of embodiment 52, wherein the printed adhesive has a discontinuous pattern on a substrate.

Embodiment 54 is a method. The method includes (a) receiving, by a manufacturing device having one or more processors, a digital object comprising data specifying a plurality of layers of an article; and (b) generating, with the manufacturing device by an additive manufacturing process using a core-sheath filament, the article including a printed adhesive, based on the digital object. The core-sheath filament includes an adhesive core and a non-tacky sheath.

Embodiment 55 is the method of embodiment 54, wherein the article includes an adhesive having a discontinuous pattern on a substrate.

Embodiment 56 is a system. The system includes (a) a display that displays a 3D model of an article and (b) one or more processors that, in response to the 3D model selected by a user, cause a 3D printer, using a core-sheath filament, to create a physical object of an article including a printed adhesive. The core-sheath filament including an adhesive core and a non-tacky sheath.

EXAMPLES

Objects and advantages of this disclosure are further illustrated by the following examples, but the particular materials and amounts thereof recited in these examples, as well as other conditions and details, should not be construed to unduly limit this disclosure.

| | Materials |
|---|---|
| DK11 | A styrene-butadiene copolymer available under the trade designation K-RESIN DK11, from Ineos Styrolution, Aurora, IL. |
| Est58213 | Aromatic polyester-based thermoplastic polyurethane with a hardness of 75A, available under the trade designation ESTANE 58213 from Lubrizol, Wickliffe, OH. |
| Ex8210 | An ethylene octane copolymer plastomer, available under the trade designation ExactTM 8210 from ExxonMobil, Houston, TX. |

-continued

| Materials | |
|---|---|
| HDPE5960 | An extrusion grade high density polyethylene with a density of 0.962 g/cm³ available under the trade designation ELITE 5960G, from Dow Chemical Company, Midland, MI. |
| HDPE6706 | A high density polyethylene resin, which is a narrow molecular weight hexane copolymer, available under the trade designation HDPE HD 6706 Series from ExxonMobil, Houston, TX. |
| Inf9807 | A thermoplastic elastomer olefin block copolymer available under the trade designation INFUSE 9807 from Dow Chemical Company, Midland, MI. |
| Ing6202 | A thermoplastic fiber-grade resin of poly lactic acid (PLA) derived from renewable resources available under the trade designation INGEO 6202D FIBER GRADE PLA, from Natureworks LLC, Minnetonka, MN. |
| K1161 | A styrene-isoprene-styrene triblock copolymer having an approximate styrene content of 15% and 19% di-block content, available under the trade designation KRATON D1161 P from Kraton Performance Polymers, Houston, TX. |
| NA217000 | A low density polyethylene resin available under the trade designation Petrothene NA217000, from Lyondell Basell, Houston, TX. |
| PP1024 | A medium melt flow rate polypropylene homopolymer resin available under the trade designation PP1024E4 from ExxonMobil, Houston, TX. |
| PP3860 | A polypropylene homopolymer resin available under the trade designation 3860X from Total, Houston, TX. |
| K100 | A petroleum resin tackifier made mainly from 1,3-pentadiene abstracted from C5 fraction, with softening point of 101 degrees Celsius available under the trade designation Quintone K100 from Zeon, Tokyo, Japan |
| P125 | A fully hydrogenated hydrocarbon resin, available under the trade designation ARKON P-125 from Arakawa Chemical, Chicago, IL. |

Test Methods

Static Shear Strength Test

Static shear strength was evaluated by dispensing blended filament adhesive at 150 degrees Celsius. The filaments were bulk blended in a Brabender mixer for 3 minutes. The blended filament was dispensed between two anodized aluminum panels. The aluminum panels were 50 millimeters by 25.4 millimeters and each had one 6 mm diameter hole centered across the width and 2 millimeters from one end lengthwise. A 0.6 gram quantity of blended filament was dispensed onto the first panel, and the second panel was immediately pressed down to a gap of 1 millimeter. The second panel was aligned such that the two panels had a 25 by 25 millimeters overlap area substantially filled with adhesive. The second panel had the opposite lengthwise orientation, such that the holes on each panel were overhanging on opposite ends along the length of the bonded sample. The adhered panels were conditioned at room temperature for 24 hours before testing. To test, the samples were hung in an oven at 70 degrees Celsius. The hole on substrate one was attached to a hook, and a 250 gram weight was hung on the hole of substrate 2. The time for the bond to cohesively fail was recorded if the failure occurred in less than 10000 minutes. Passing the Static Shear Strength Test requires achieving a time of 10000 minutes or longer without cohesive failure.

Mechanical Testing of Fibers

Testing of the tensile-elongation properties of fibers of the sheath materials were carried out using a tensile tester equipped with a 50 kiloNewton load cell at room temperature with a separation rate of 30.5 centimeters/minute. Measurements were made in accordance with ASTM D638-14, using test specimen Type IV. Each fiber was wrapped around a ring fixture and a single sided vinyl tape was applied to prevent unwrapping of the fiber. The initial gap between rings was 25.4 millimeters, and the fiber was extended an additional 153 millimeters. The tensile strain at break (% elongation) and tensile stress at break (MegaPascals) were recorded. If the fiber did not break, the stress at 153 elongation was recorded. The Shore D hardness of each fiber was measured in accordance with ASTM D2240.

Self-Adhesion Test

It is critical for the core-sheath filaments to not fuse together during storage. The sheath material provides the non-adhering surface to cover the core adhesive. The Self-Adhesion Test was conducted on films of the pure sheath material to determine whether or not candidate sheath materials would meet the requirement of being "non-tacky". Coupons (25 millimeters×75 millimeters×0.8 millimeters) were cut out. For each material two coupons were stacked on each other, and placed on a flat surface within an oven. A 750 gram weight (43 millimeters diameter, flat bottom) was placed on top of the two coupons, with the weight centered over the films. The oven was heated to 50 degrees Celsius, and the samples were left at that condition for 4 hours, and then cooled to room temperature. A static T-peel test was used to evaluate pass/fail. The end of one coupon was fixed to an immobile frame, and a 250 g weight was attached to the corresponding end of the other coupon. If the films were flexible and began to peel apart, they formed a T-shape. If the two coupons could be separated with the static 250 gram load within 3 minutes of applying the weight to the second coupon, it was considered a pass and was non-tacky. Otherwise, if the two coupons remained adhered, it was considered a fail.

TABLE 1

Properties of sheath materials

| Sheath polymers | Sheath material | Melt flow index g/10 min$^a$ | Tensile Strain at Break (% elongation) | Tensile Stress at Break (MPa) | Shore D Hardness | Self adhesion test |
|---|---|---|---|---|---|---|
| CS-1 | PP3860 | 100$^b$ | 8 | 22.4 | 72 | PASS |
| CS-2 | Ing6202 | 15-30$^d$ | 90 | 50 | 84 | PASS |
| CS-3 | Inf9807 | 15$^c$ | 1869 | 2.7 | 13 | FAIL |
| ES-1 | HDPE5960 | 0.89$^c$ | 65 | 14.7 | 64 | PASS |
| ES-2 | DK11 | 7.5$^e$ | 400 | 15 | 65 | PASS |

TABLE 1-continued

Properties of sheath materials

| Sheath polymers | Sheath material | Melt flow index g/10 min[a] | Tensile Strain at Break (% elongation) | Tensile Stress at Break (MPa) | Shore D Hardness | Self adhesion test |
|---|---|---|---|---|---|---|
| ES-3 | HDPE6706 | 6.7[c] | 60 | 13.9 | 60 | PASS |
| ES-4 | Est58213 | NR | NT | NT | NT | NT |
| ES-5 | Ex8210 | 10[c] | 1610 | 10.6 | 31 | PASS |
| ES-6 | NA217000 | 5.6[c] | 220 | 7.6 | 52 | PASS |
| ES-7 | PP1024 | 13[b] | 96 | 17.9 | 72 | PASS |

[a]Manufacturer's reported values based on ASTM 1238, specific sub-conditions are noted, [b]230° C./2.16 kilogram, [c]190° C./2.16 kilogram, [d]210° C., [e]200° C./5 kilogram, NR = not reported. NT = not tested.

Preparation of Core-Sheath Filament Examples

Core-sheath filaments were made by co-extruding a non-tacky outer sheath layer around an inner PSA core, with the example compositions described in Table 2 below. For all samples, the PSA core was compounded at 200 rotations per minute using an 18 millimeter co-rotating twin screw extruder (available from Coperian GmbH (Stuttgart, Germany)) with all zones heated between 160 degrees Celsius and 170 degrees Celsius. The PSA core was compounded according to the following procedure: K1161 was dry-fed into the first zone and P125 (or K100) was dry fed into the third zone of the PSA core extruder. After the PSA core was compounded, the melt stream was metered using a 3 cc/rev gear-pump (available from Colfax Corporation (Annapolis Junction, Md.)). The non-tacky outer sheath was melted and extruded using a 19.1 millimeters single screw extruder (HAAKE brand, available from Thermo Fisher Scientific (Waltham, MA)). Both melt streams were fed into a co-axial die having a ~3.50 millimeters exit diameter, which is described in U.S. Pat. No. 7,773,834 (Ouderkirk et al). The PSA was fed into the inner core layer of the co-axial die, while the non-tacky sheath material was fed into the outer sheath of the die; ultimately producing a core-sheath filament. The filament was drawn to either 1.75 or 3 millimeters final diameter through a water bath at room temperature (22 degrees Celsius). The filaments were wound onto 75 millimeter diameter tubes for storage.

TABLE 2

Compositions of filament samples

| Filaments | Sheath material | Core base resin | Core tackifier | Core base resin: tackifier ratio | Filament Diameter | Extension at Break (mm) | Force[2] at Break, N | Shear, time to fail, min |
|---|---|---|---|---|---|---|---|---|
| CF-1 | PP3860 | K1161 | K100 | 60:40 | 1.75 mm | 4.4 | 4.4 | 259 |
| CF-2 | Ing6202 | K1161 | P125 | 60:40 | 3.0 mm | 14.5 | 55.6 | 1604 |
| CF-3 | Inf9807 | K1161 | P125 | 50:50 | 3.0 mm | NA[1] | 3.1 | 531 |
| EF-1 | HDPE5960 | K1161 | P125 | 60:40 | 3.0 mm | NA[1] | 13.3 | 3966 |
| EF-2 | DK11 | K1161 | P125 | 60:40 | 3.0 mm | NA[1] | 40.9 | 10000[3] |
| EF-3 | HDPE6706 | K1161 | P125 | 50:50 | 3.0 mm | 46.2 | 15.1 | 464 |
| EF-4 | Est58213 | K1161 | P125 | 50:50 | 3.0 mm | NA[1] | 6.2 | 376 |
| EF-5 | DK11 | K1161 | P125 | 60:40 | 3.0 mm | NA[1] | 14.7 | 2227 |

Figure 4A:
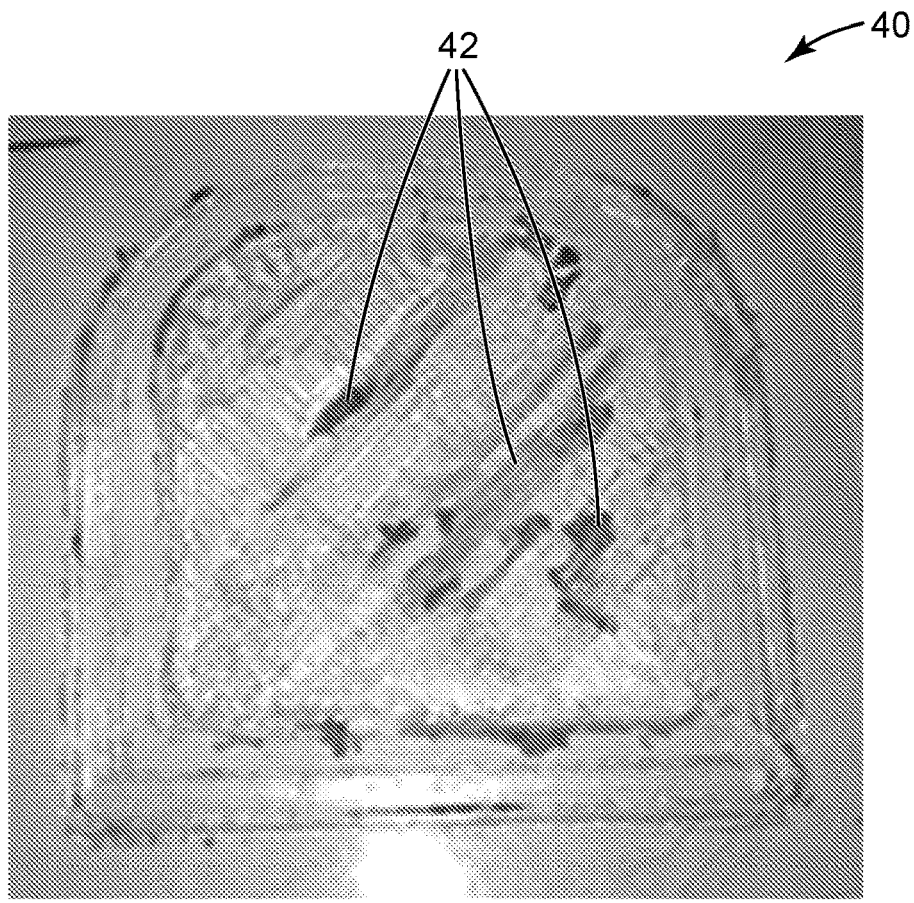
FIG. 4*a* is a perspective view of a printed adhesive of comparative example CF-3.
Figure 4B:
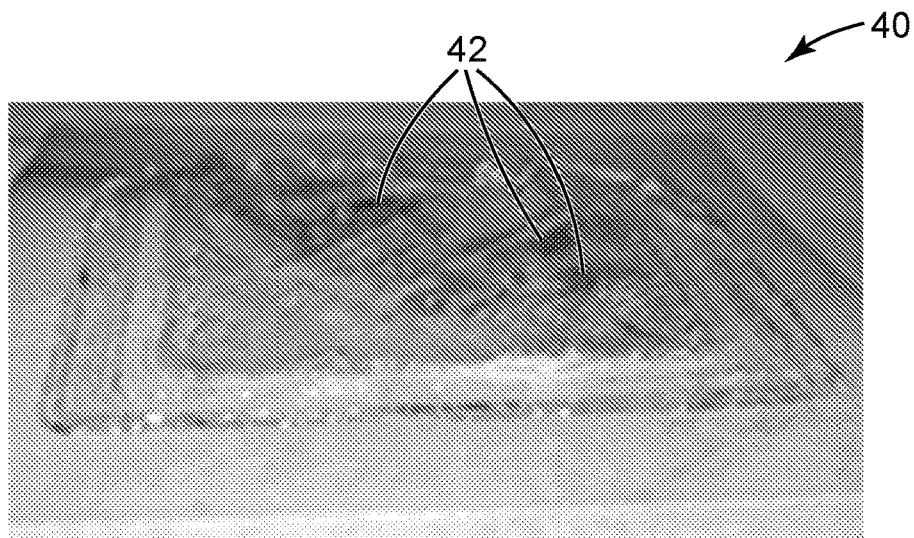
FIG. 4*b* is another perspective view of the printed adhesive of comparative example CF-3.
Figure 5A:
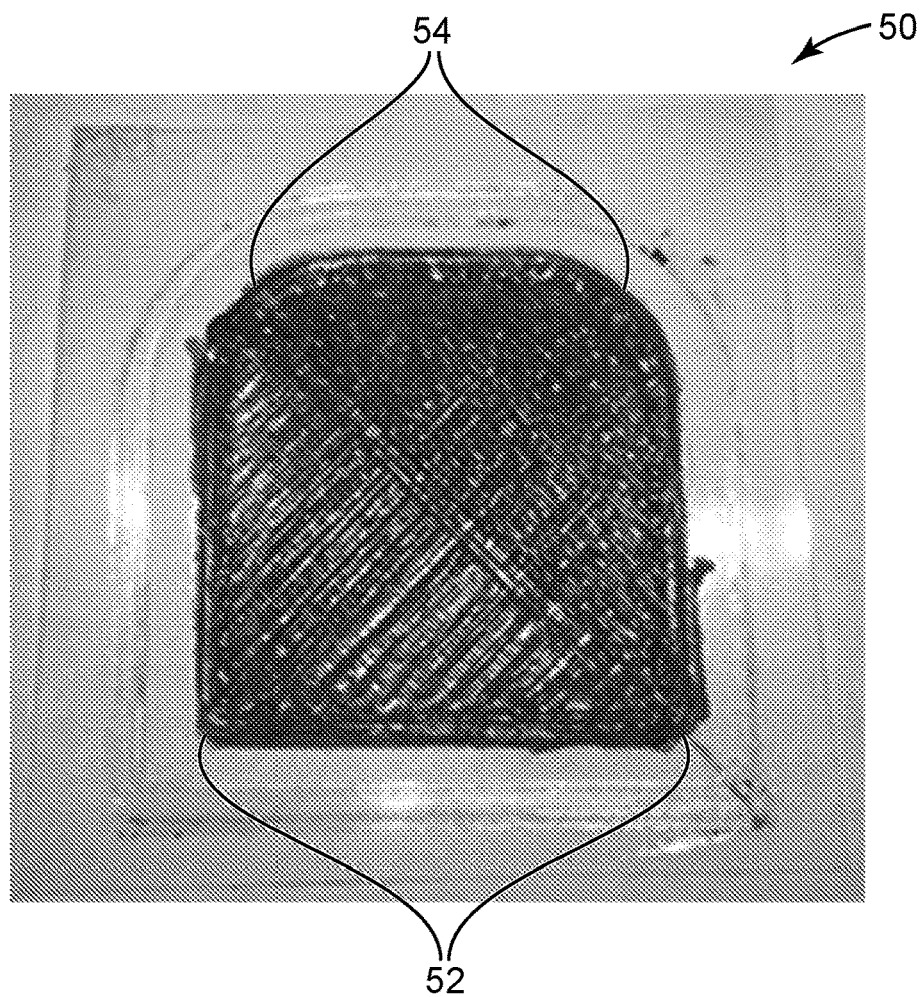
FIG. 5*a* is a perspective view of a printed adhesive of example EF-1.
Figure 5B:
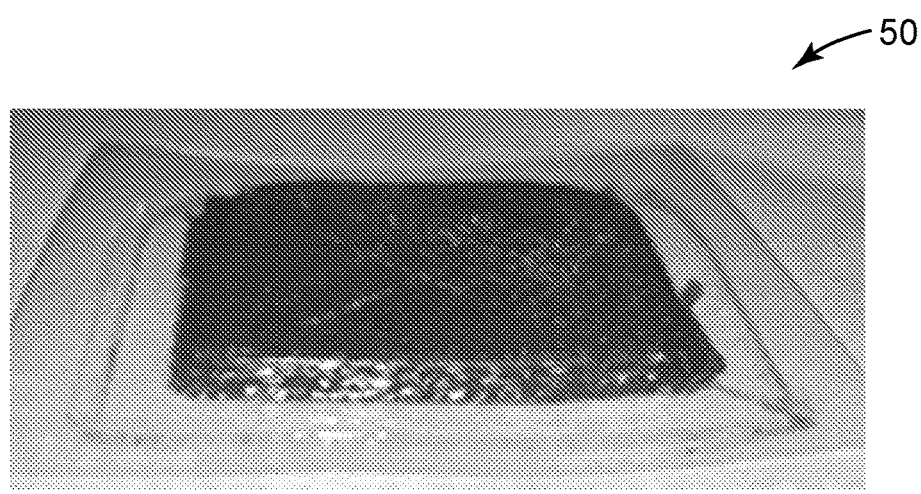
FIG. 5*b* is another perspective view of the printed adhesive of example EF-1.

[1]No breakage occurred with 153 millimeters of extension
[2]If the filament did not break, the stress at 153 millimeters extension was recorded
[3]The sample did not fail after 10000 minutes of testing 3D Printing 3D printing of the PSA filaments was performed using a Da Vinci Jr. 1.0 from XYZ Printing (San Diego, CA). The extruder temperature was set to 240 degrees Celsius and the bed temperature was set to 0 degrees Celsius. A 3M Japan 3D Printer Film 3099AB was used for adhesion to the build plate. The feed rate was 10 millimeters per second, and the layer height was 0.25 millimeters. The filaments were manually fed into the extruder head. The initial layer height was 0.5 millimeters. Printing of CF-3 was attempted, but the adhesive extruded very thick and slowly. In particular, referring to FIGS. 4a and 4b, it can be seen that the printed adhesive 40 from CF-3 includes several areas 42 in which the adhesive was printed unevenly. In contrast, printing of EF-1 and EF-2 was attempted, and was successful. For instance, referring to FIGS. 5a and 5b, the shapes two square corners 52 and the two rounded corners 54 are clear and the adhesive from EF-1 was printed evenly throughout.

All of the patents and patent applications mentioned above are hereby expressly incorporated by reference. The embodiments described above are illustrative of the present invention and other constructions are also possible. Accordingly, the present invention should not be deemed limited to the embodiments described in detail above and shown in the accompanying drawings, but instead only by a fair scope of the claims that follow along with their equivalents.

The invention claimed is:

1. A method of printing an adhesive, comprising:
   a. melting a core-sheath filament comprising an adhesive core and a non-tacky sheath in a nozzle to form a molten composition, the non-tacky sheath exhibiting a melt flow index of less than 15 grams per 10 minutes (g/10 min) and an elongation at break of 100% or more, and the adhesive core being a pressure-sensitive adhesive and comprised of a styrenic block copolymer and a tackifier,
      wherein the styrenic block copolymer has a glassy block comprising polystyrene and a rubbery block comprising poly (isoprene), poly (butadiene), or poly (isoprene/butadiene), and
      wherein the styrenic block copolymer comprises 5 to 50 weight percent glassy blocks and the remainder of the weight of the styrenic block copolymer is attributable to the rubbery blocks; and
   b. dispensing the molten composition through the nozzle onto a substrate;
      wherein steps a. and b. are carried out one or more times to form a printed adhesive.

2. The method of claim 1, wherein the molten composition is mixed in the nozzle, during dispensing through the nozzle, or both.

3. The method of claim 1, wherein the printed adhesive comprises an integral shape that varies in thickness in an axis normal to the substrate.

4. The method of claim 1, wherein the printed adhesive forms a discontinuous pattern on the substrate.

5. The method of claim 1, wherein the sheath consists of one or more materials that are functional components of the adhesive of the adhesive core.

* * * * *